United States Patent
Okada et al.

(10) Patent No.: US 10,232,834 B2
(45) Date of Patent: Mar. 19, 2019

(54) BRAKE DEVICE

(71) Applicants: Mazda Motor Corporation, Hiroshima (JP); Hitachi Automotive Systems, Ltd., Ibaraki (JP)

(72) Inventors: Michiharu Okada, Hiroshima (JP); Shigeyuki Uehara, Hiroshima (JP); Tatsuro Kobune, Atsugi (JP); Wataru Yokoyama, Yokohama (JP); Kimio Nishino, Atsugi (JP); Kenichiro Matsubara, Kasumigaura (JP)

(73) Assignees: MAZDA MOTOR CORPORATION, Hiroshima (JP); HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/539,841

(22) PCT Filed: Dec. 25, 2015

(86) PCT No.: PCT/JP2015/086181
§ 371 (c)(1),
(2) Date: Jun. 26, 2017

(87) PCT Pub. No.: WO2016/104680
PCT Pub. Date: Jun. 30, 2016

(65) Prior Publication Data
US 2017/0355356 A1 Dec. 14, 2017

(30) Foreign Application Priority Data
Dec. 27, 2014 (JP) .................................. 2014-266815

(51) Int. Cl.
*B60T 13/00* (2006.01)
*B60T 8/1761* (2006.01)
(Continued)

(52) U.S. Cl.
CPC .......... *B60T 8/17613* (2013.01); *B60T 7/042* (2013.01); *B60T 7/06* (2013.01); *B60T 8/00* (2013.01);
(Continued)

(58) Field of Classification Search
CPC ...... B60T 13/74; B60T 13/745; B60T 13/746; B60T 8/17; B60T 8/17613
(Continued)

(56) References Cited

U.S. PATENT DOCUMENTS

| | | | | |
|---|---|---|---|---|
| 6,139,117 A | * | 10/2000 | Shirai | B60T 13/74 188/1.11 R |
| 2006/0049691 A1 | * | 3/2006 | Deprez | B60T 7/00 303/191 |

(Continued)

FOREIGN PATENT DOCUMENTS

| | | | | |
|---|---|---|---|---|
| EP | 2 944 525 | | 11/2015 | |
| GB | 2342967 | * | 4/2000 | B60T 7/12 |

(Continued)

OTHER PUBLICATIONS

International Search Report dated Feb. 9, 2016 in International Application No. PCT/JP2015/086181.

*Primary Examiner* — Christopher P Schwartz
(74) *Attorney, Agent, or Firm* — Wenderoth, Lind & Ponack, L.L.P.

(57) ABSTRACT

Provided is a brake device capable of maintaining pads and a rotor in a desired positional relationship. When receiving a release request within a time period from start of execution of an application request to detection of contact between brake pad and a disc rotor, a parking brake control device inhibits execution of the release request, and executes the release request after detection of the contact between the brake pad and the disc rotor. Further, when receiving the
(Continued)

application request within a time period from start of execution of the release request to detection of separation between the brake pad and the disc rotor, the parking brake control device inhibits execution of the application request, and executes the application request after detection of the separation between the brake pad and the disc rotor.

8 Claims, 15 Drawing Sheets

(51) Int. Cl.
<table>
<tr><td>B60T 8/00</td><td>(2006.01)</td></tr>
<tr><td>B60T 13/74</td><td>(2006.01)</td></tr>
<tr><td>B60T 7/04</td><td>(2006.01)</td></tr>
<tr><td>B60T 7/06</td><td>(2006.01)</td></tr>
<tr><td>F16D 65/18</td><td>(2006.01)</td></tr>
<tr><td>F16D 66/00</td><td>(2006.01)</td></tr>
<tr><td>F16D 121/24</td><td>(2012.01)</td></tr>
<tr><td>F16D 125/50</td><td>(2012.01)</td></tr>
<tr><td>B60T 8/32</td><td>(2006.01)</td></tr>
</table>

(52) U.S. Cl.
CPC ............ *B60T 8/1761* (2013.01); *B60T 13/74* (2013.01); *B60T 13/745* (2013.01); *B60T 13/746* (2013.01); *F16D 65/183* (2013.01); *B60T 8/32* (2013.01); *F16D 2066/003* (2013.01); *F16D 2121/24* (2013.01); *F16D 2125/50* (2013.01)

(58) Field of Classification Search
USPC ...... 188/1.11 E, 1.11 L; 303/191; 701/70, 72
See application file for complete search history.

(56) References Cited

U.S. PATENT DOCUMENTS

<table>
<tr><td>2008/0059023 A1*</td><td>3/2008</td><td>Ueno</td><td>B60T 1/10<br>701/36</td></tr>
<tr><td>2008/0147286 A1*</td><td>6/2008</td><td>Goss</td><td>B60T 7/085<br>701/70</td></tr>
<tr><td>2009/0204302 A1*</td><td>8/2009</td><td>Kondo</td><td>B60T 11/046<br>701/70</td></tr>
<tr><td>2010/0072811 A1*</td><td>3/2010</td><td>Kondo</td><td>B60T 13/588<br>303/20</td></tr>
<tr><td>2010/0250062 A1*</td><td>9/2010</td><td>Desfriches</td><td>B60T 7/122<br>701/36</td></tr>
<tr><td>2011/0278108 A1*</td><td>11/2011</td><td>Watanabe</td><td>B60T 7/042<br>188/72.3</td></tr>
<tr><td>2011/0295478 A1*</td><td>12/2011</td><td>Jeon</td><td>B60T 7/107<br>701/70</td></tr>
<tr><td>2013/0261917 A1*</td><td>10/2013</td><td>Kotake</td><td>B60T 13/741<br>701/70</td></tr>
<tr><td>2014/0142827 A1</td><td>5/2014</td><td>Shimizu</td><td></td></tr>
</table>

FOREIGN PATENT DOCUMENTS

<table>
<tr><td>GB</td><td>2376990</td><td>* 12/2002</td><td>............... B60T 7/12</td></tr>
<tr><td>JP</td><td>2000-55093</td><td>2/2000</td><td></td></tr>
<tr><td>JP</td><td>2003-175816</td><td>6/2003</td><td></td></tr>
<tr><td>JP</td><td>2008-57643</td><td>3/2008</td><td></td></tr>
<tr><td>JP</td><td>2013-209041</td><td>10/2013</td><td></td></tr>
<tr><td>JP</td><td>2014-104772</td><td>6/2014</td><td></td></tr>
<tr><td>JP</td><td>2014-133429</td><td>7/2014</td><td></td></tr>
</table>

* cited by examiner

US 10,232,834 B2

BRAKE DEVICE

TECHNICAL FIELD

The present invention relates to a brake device configured to apply a braking force to a vehicle.

BACKGROUND ART

As a brake device provided to a vehicle, for example, an automobile, there is known a brake device having an electric parking brake function which is actuated based on drive of an electric motor (see Patent Literature 1).

CITATION LIST

Patent Literature

PTL 1: JP 2013-209041 A

SUMMARY OF INVENTION

Technical Problem

In Patent Literature 1, no consideration has been made on maintaining pads and a rotor in a desired positional relationship.

Therefore, an object of the present invention is to provide a brake device capable of maintaining pads and a rotor in a desired positional relationship.

Solution to Invention

In order to solve the above-mentioned problem, according to one embodiment of the present invention, there is provided a brake device, including: a pad configured to press a rotor, which is rotated together with a wheel, to thereby apply a braking force to a vehicle; a piston configured to move the pad toward the rotor or in a direction away from the rotor; an electric motor configured to move the piston when a current is fed to the electric motor; a request generating unit configured to generate a first request and a second request, each relating to the braking force to the vehicle; an execution unit configured to receive a request generated by the request generating unit to feed the current to the electric motor in accordance with the request, to thereby execute the request; and a detection unit configured to detect contact or separation between the pad and the rotor. When receiving the second request within a time period from start of execution of the first request to detection of the contact or the separation between the pad and the rotor by the detection unit, the execution unit inhibits execution of the second request, and executes the second request after the detection unit detects the contact or the separation between the pad and the rotor.

According to the brake device of the one embodiment of the present invention, the pad and the rotor can be maintained in a desired positional relationship.

DESCRIPTION OF EMBODIMENTS

Now, a brake device according to an embodiment of the present invention is described in detail with reference to the accompanying drawings, taking a case where the brake device is mounted in a four-wheeled automobile as an example.

Figure 1:
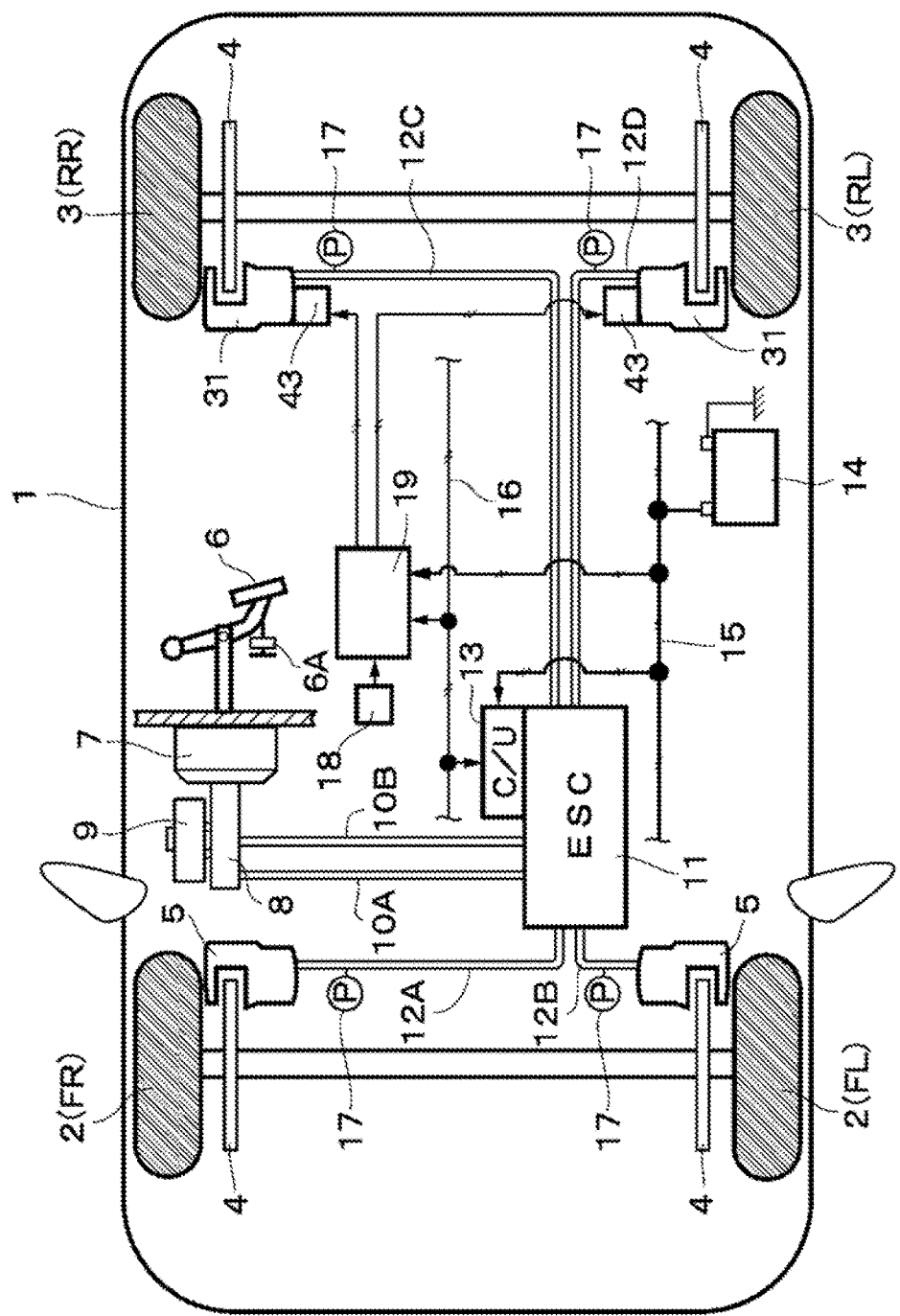
FIG. 1 is a conceptual view of a vehicle in which a brake device according to a first embodiment of the present invention is mounted.

FIG. 1 to FIG. 13 are views for illustrating a first embodiment of the present invention. In FIG. 1, four wheels including, for example, left and right front wheels 2 (FL, FR) and left and right rear wheels 3 (RL, RR) are provided to a lower side (on a road surface side) of a vehicle body 1 constructing a body of a vehicle. Disc rotors 4 serving as rotors (rotary members), which are rotated together with the wheels (the front wheels 2 and the rear wheels 3), are provided to the front wheels 2 and the rear wheels 3, respectively. Specifically, for each of the front wheels 2, the disc rotor 4 is sandwiched by a hydraulic disc brake 5. For each of the rear wheels 3, the disc rotor 4 is sandwiched by a hydraulic disc brake 31 having an electric parking brake function described later. In this manner, a braking force is applied for each of the wheels (each of the front wheels 2 and the rear wheels 3).

On a front board side of the vehicle 1, a brake pedal 6 is provided. A depressing operation is performed by a driver on the brake pedal 6 at the time of a braking operation for the vehicle. Based on the operation, application and release of the braking force are performed as a main brake (service brake). A brake lamp switch, a pedal switch, and a brake operation sensor (brake sensor) 6A, for example, a pedal stroke sensor are provided to the brake pedal 6. The brake operation sensor 6A is configured to detect whether or not the depressing operation has been performed on the brake pedal 6 and the amount of operation thereof and output a detection signal to a hydraulic pressure supply device controller 13 described later. Further, the signal (information) from the brake operation sensor 6A is transmitted via, for example, a vehicle data bus 16 described later or a signal line (not shown) which connects the hydraulic pressure supply device controller 13 and a parking brake control device 19 described later to each other, and is output to the parking brake control device 19.

The depressing operation of the brake pedal 6 is transmitted via a booster 7 to a master cylinder 8. The booster 7 is constructed by a negative pressure booster, an electric booster provided between the brake pedal 6 and the master cylinder 8 or the like, and is configured to boost a depressing force at the time of the depressing operation of the brake pedal 6 and transmit the depressing force to the master cylinder 8. At this time, the master cylinder 8 generates a hydraulic pressure by a brake fluid supplied from a master reservoir 9. The master reservoir 9 is constructed by a working fluid tank which stores the brake fluid therein. A mechanism configured to generate the hydraulic pressure by the brake pedal 6 is not limited to the configuration described above, and may be, for example, a brake-by-wire mechanism.

The hydraulic pressure generated in the master cylinder 8 is transmitted to a hydraulic pressure supply device 11 (hereinafter referred to as "ESC 11") via, for example, a pair of cylinder-side hydraulic pressure pipes 10A and 10B. The ESC 11 is configured to distribute and supply the hydraulic pressure transmitted from the master cylinder 8 to each of the disc brakes 5 and 31 via one of brake-side pipe portions 12A, 12B, 12C, and 12D. In this manner, the braking force is applied for each of the wheels (each of the front wheels 2 and the rear wheels 3) as described above.

The ESC 11 is arranged between the disc brakes 5 and 31 and the master cylinder 8. The ESC 11 includes the hydraulic pressure supply device controller 13 (hereinafter referred to as "control unit 13") configured to control actuation thereof. The control unit 13 controls drive of the ESC 11 to supply a brake fluid to the disc brakes 5 and 31 respectively through the brake-side pipe portions 12A to 12D, thereby performing control for boosting, reducing, or maintaining brake fluid pressures respectively in the disc brakes 5 and 31. In this manner, for example, brake control, for example, boost control, braking-force distribution control, brake assist control, antilock brake control (ABS), traction control, vehicle stabilization control including antiskid control, hill start aid control, and automatic drive control is executed.

The control unit 13 is constructed by, for example, a microcomputer, and is fed with power from a battery 14 through a power supply line 15. Further, the control unit 13 is connected to the vehicle data bus 16 and the like, as illustrated in FIG. 1. In place of the ESC 11, a publicly-known ABS unit may be used. Further, the master cylinder 8 may be directly connected to the brake-side pipe portions 12A to 12D without providing the ESC 11, that is, with omission of the ESC 11.

The vehicle data bus 16 may be constructed to include a CAN serving as a serial communication unit mounted in the vehicle body 1, and is configured to perform multiplex communication inside the vehicle among a large number of electronic devices, the control unit 13, the parking brake control device 19 described later, and the like, which are mounted in the vehicle. In this case, vehicle information to be transmitted to the vehicle data bus 16 includes information based on detection signals from, for example, pressure sensors 17, the brake operation sensor 6A, an ignition switch, a seat belt sensor, a door lock sensor, a door opening sensor, a seating sensor, velocity sensors (wheel-velocity sensors or vehicle-velocity sensor), a shift sensor (transmission sensor), a steering-angle sensor, an accelerator sensor (accelerator operation sensor), a throttle sensor, an engine rotation sensor, a gradient sensor, a G sensor (acceleration sensor), a stereo camera, and a millimeter wave radar.

The pressure sensors 17 are respectively provided to the brake-side pipe portions 12A, 12B, 12C, and 12D, and are configured to individually detect internal pipeline pressures (hydraulic pressures), that is, hydraulic pressures (cylinder hydraulic pressures) in calipers 34 (cylinder portions 36) described later corresponding to the internal pipeline pressures. The number of the pressure sensors 17 to be provided may be one or two. For example, the pressure sensors 17 may be provided only to the cylinder-side hydraulic pipes 10A and 10B between the master cylinder 8 and the ESC 11, to thereby detect a master cylinder hydraulic pressure.

A parking brake switch (parking switch) 18 is provided in the vicinity of a driver's seat (not shown) inside the vehicle body 1. The parking brake switch 18 is operated by a driver of the vehicle. The parking brake switch 18 is configured to transmit, to the parking brake control device 19 described later, a signal (actuation request signal) corresponding to an actuation request (application request or release request) for the parking brake from the driver. Specifically, the parking brake switch 18 is configured to output, to the parking brake control device 19, the signal (application request signal or release request signal) for application actuation or release actuation of brake pads 33 based on drive (rotation) of electric motors 43B described later.

When the parking brake switch 18 is operated to a braking side (parking brake ON side) by the driver, specifically, when the application request (maintaining request or drive request) to apply the braking force to the vehicle is given, the application request signal is output from the parking brake switch 18. In this case, power for rotating the electric motors 43B to the braking side is fed to the disc brakes 31 for the rear wheels 3 via the parking brake control device 19. As a result, the disc brakes 31 for the rear wheels 3 are brought into a state in which the braking force as parking brakes or auxiliary brakes is applied, that is, an applied state.

Meanwhile, when the parking brake switch 18 is operated to a braking release side (parking brake OFF side) by the driver, specifically, when the release request (releasing request) to release the braking force for the vehicle is given, the release request signal is output from the parking brake switch 18. In this case, power for rotating the electric motors 43B in a direction opposite to the braking side is fed to the disc brakes 31 via the parking brake control device 19. As a result, the disc brakes 31 for the rear wheels 3 are brought into a state in which the application of the braking force as the parking brakes or the auxiliary brakes is released, that is, a release state.

In the parking brake, the braking force may be automatically applied (auto-applied) based on an automatic application request given in accordance with an application determination logic for the parking brake in the parking brake control device 19, for example, when the vehicle is in a stopped state for a given time period, specifically, the vehicle is determined as being in a stopped state based on continuation of a state in which a velocity detected by the vehicle-velocity sensor is lower than 4 km/m for a given time period along with deceleration during running, when an engine is stopped (stalled), when a shift lever (select lever or select switch) is operated to a P (parking) position, when a door is opened, or when a seat belt is unfastened. Further, in the parking brake, the braking force may be automatically released (auto-released) based on an automatic release request given in accordance with a release determination logic for the parking brake in the parking brake control device 19, for example, when the vehicle is in a running state, specifically, the vehicle is determined as being in a running state based on continuation of a state in which a velocity detected by the vehicle-speed sensor is 5 km/h or higher for a given time period along with acceleration from the stopped state, when an accelerator pedal is operated, when a clutch pedal is operated, or when the shift lever is placed in a position other than P and N (neutral). Further, when the application request is given by the parking brake switch 18 while the vehicle is running, more specifically, a request for dynamic parking brake (dynamic application) for using the parking brake as the auxiliary brake in emergency is given during running, whether or not the wheels (respective rear wheels 3) are locked (are slipping) is determined by the parking brake control device 19. The braking force can be automatically applied or released, specifically, the ABS control can be performed, based on the application request or the release request in accordance with states of the wheels, for example, whether or not the wheels are locked.

Figure 2:
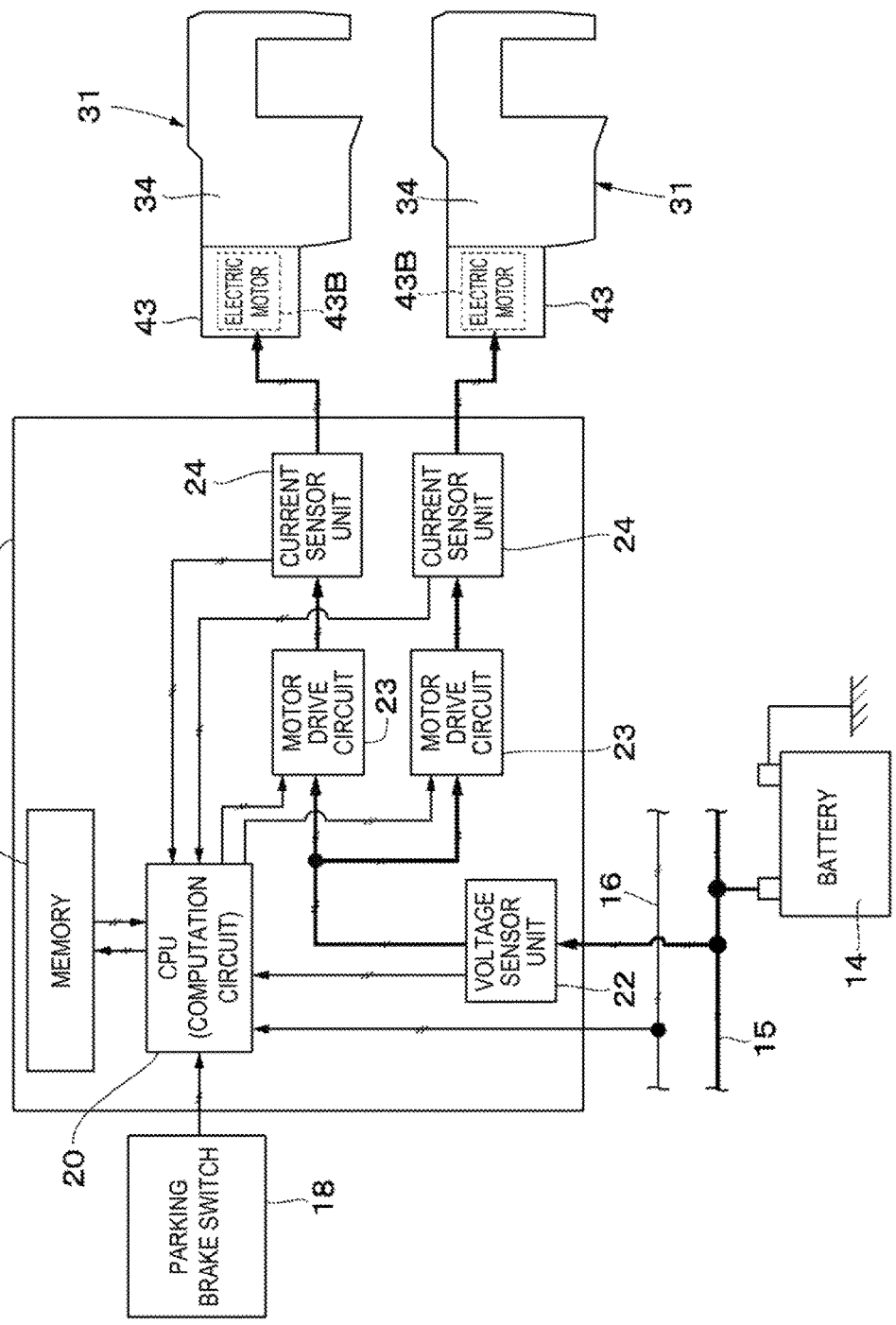
FIG. 2 is a block diagram for illustrating a parking brake control device illustrated in FIG. 1.

The parking brake control device 19 constructs an electric brake system (brake device) together with the pair of left and right disc brakes 31 described later. As illustrated in FIG. 2, the parking brake control device 19 includes a computation circuit (CPU) 20 constructed by a microcomputer or the like. Power from the battery 14 is fed to the parking brake control device 19 through the power supply line 15.

The parking brake control device 19 constructs control means (controller or control unit), and is configured to control the electric motors 43B for the disc brakes 31 described later so as to generate a braking force (parking brake or auxiliary brake) when the vehicle is parked or stopped, and during running as needed. Specifically, the parking brake control device 19 drives the electric motors 43B to actuate (apply or release) the disc brakes 31 as the parking brakes or the auxiliary brakes as needed.

The parking brake control device 19 drives the electric motors 43B described later to apply (retain) or release the disc brakes 31 based on an actuation request (application request or release request) given through an operation of the parking brake switch 18 performed by the driver. In addition, the parking brake control device 19 drives the electric motors 43B based on the actuation request in accordance with the application and release determination logics for the parking brakes described above so as to apply or release the disc brakes 31. Further, the parking brake control device 19 drives the electric motors 43B based on the actuation request through the ABS control so as to apply or release the disc brakes 31. At this time, in each of the disc brakes 31, a piston 39 and the brake pads 33 are retained or released by a pressing-member retaining mechanism (rotation-linear motion conversion mechanism 40) based on the drive of the electric motor 43B.

As described above, in this embodiment, the requests relating to the braking force applied to the vehicle, specifically, the release requests and the application requests include manual ones generated by the parking brake switch 18 and automatic ones generated based on the application and release determination logics for the parking brake control device 19 or through the ABS control. In this embodiment, the parking brake switch 18 and/or the parking brake control device 19 constructs a request generating unit configured to generate requests relating to the braking force applied to the vehicle, specifically, the release request as a first request or a second request and the application request as the second request or the first request. In this embodiment, the requests generated by the request generating unit include a request (application request or release request in accordance with whether or not the rear wheels 3 are locked) generated by an ABS control unit configured to control the ABS in addition to a request generated by the operation performed by the driver and a request based on the application and release determination logics. Then, the parking brake control device 19 includes an execution unit configured to receive the request generated by the request generating unit to supply a current to each of the electric motors 43B in accordance with the request so as to execute the request.

Figure 3:
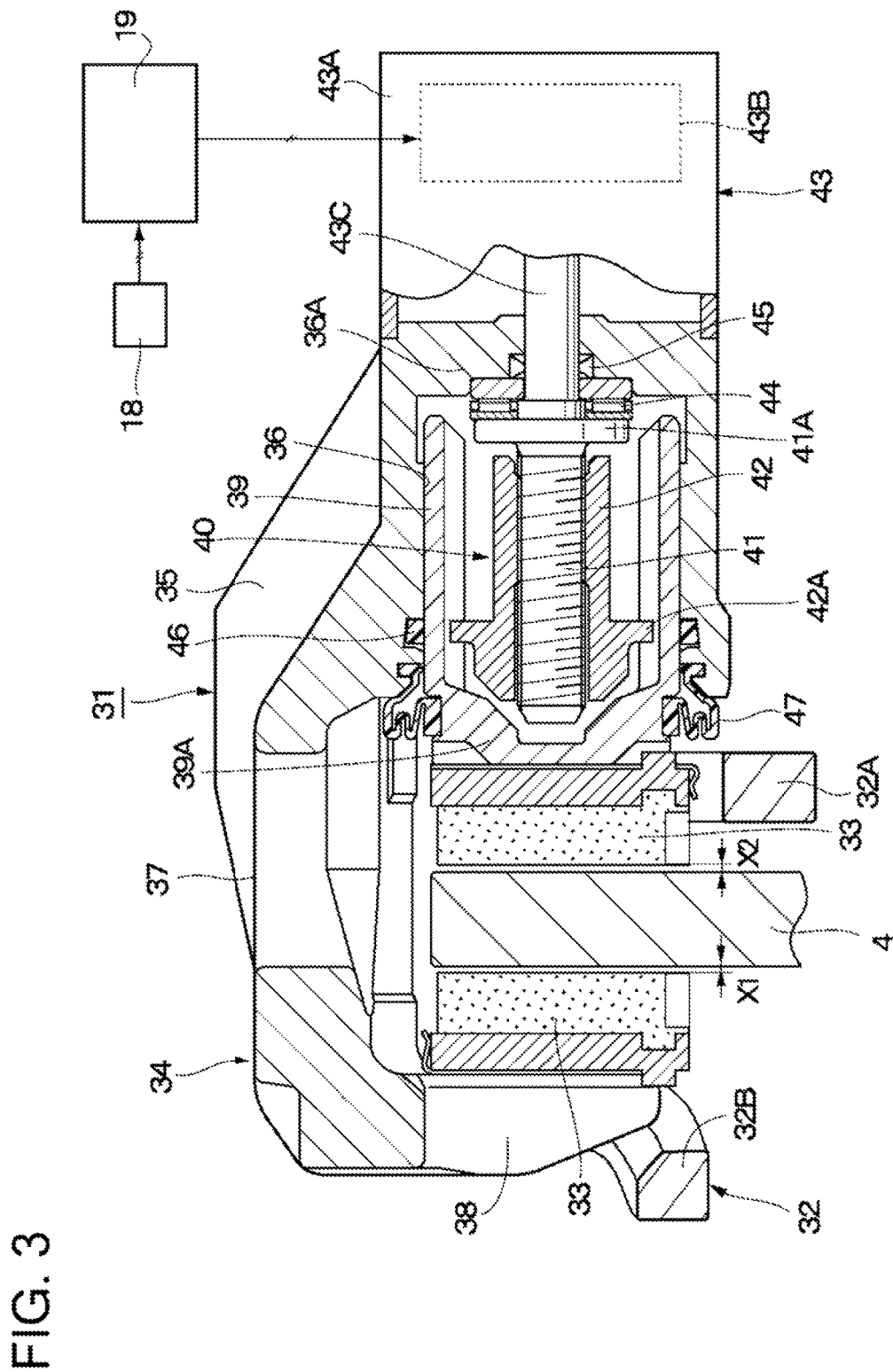
FIG. 3 is a longitudinal sectional view for illustrating, in an enlarged manner, a disc brake having an electric parking brake function provided to a rear wheel side illustrated in FIG. 1.

Therefore, as illustrated in FIG. 1 to FIG. 3, the parking brake control device 19 has an input side connected to the parking brake switch 18 and an output side connected to the electric motors 43B of the disc brakes 31. More specifically, as illustrated in FIG. 2, besides a storage unit (memory) 21 described later, the parking brake switch 18, the vehicle data bus 16, a voltage sensor unit 22 described later, motor drive circuits 23, current sensor units 24, and the like are connected to the computation circuit (CPU) 20 of the parking brake control device 19. Various state quantities of the vehicle, specifically, various types of vehicle information described above, which are necessary for the control (actuation) of the parking brakes, can be acquired through the vehicle data bus 16.

The vehicle information acquired through the vehicle data bus 16 may be acquired by directly connecting the above-mentioned various sensors to the parking brake control device 19 (the computation circuit 20 thereof).

The computation circuit 20 of the parking brake control device 19 may be configured so that the actuation request based on the determination logics or the ABS control described above is input from another control device, for example, the control unit 13 connected to the vehicle data bus 16. In this case, the determination of application and release of the parking brakes in accordance with the determination logics described above and the ABS control can be performed by another control device, for example, the control unit 13 in place of the parking brake control device 19. In other words, the control performed by the parking brake control device 19 can be integrated with those of the control unit 13.

The parking brake control device 19 includes the storage unit (memory) 21 (see FIG. 2) constructed by, for example, a flash memory, a ROM, a RAM, an EEPROM, or the like. In the storage unit 21, processing programs described later illustrated in FIG. 4 to FIG. 8 are stored in addition to programs for the above-mentioned application and release determination logics for the parking brakes and for the ABS control. Specifically, a processing program to be used for application control processing (FIG. 4), a processing program to be used for processing of determination of contact between the disc rotor 4 and the brake pads 33 and application completion determination (FIG. 5), a processing program to be used for release control processing (FIG. 6), a processing program to be used for processing of determination of separation between the disc rotor 4 and the brake pads 33 and release completion determination when the vehicle is in a stopped state (FIG. 7), and a processing program to be used for processing of determination of separation between the disc rotor 4 and the brake pads 33, application allowance determination, and release completion determination while the vehicle is running (FIG. 8), and the like are stored in the storage unit 21.

Further, various determination values (including an application completion threshold value, a contact determination threshold value, a second peak threshold value, a zero thrust-force threshold value, a gap threshold value, and a minimum return amount) used in the processing programs are stored in the storage unit 21. Further, a current value of each of the electric motors 43B, a current derivative value, a contact flag state (ON or OFF), an application completion flag state (ON or OFF), a separation flag state (ON or OFF), an application allowance flag state (ON or OFF), a release completion flag state (ON or OFF), and the like are stored in the storage unit 21 so as to be updatable (rewritable).

In the first embodiment, the parking brake control device 19 is constructed separately from the control unit 13 of the ESC 11. However, the parking brake control device 19 may be constructed integrally with the control unit 13. Further, although the parking brake control device 19 controls the two, that is, left and right disc brakes 31, the parking brake control device 19 may be provided for each of the left and right disc brakes 31. In this case, the parking brake control device 19 may be provided integrally with each of the disc brakes 31.

As illustrated in FIG. 2, the parking brake control device 19 includes the voltage sensor unit 22 configured to detect a voltage from the power supply line 15, the left motor drive circuit 23 and the right motor drive circuit 23 configured to respectively drive the left electric motor 43B and the right electric motor 43B, the left current sensor unit 24 and the right current sensor unit 24 configured to respectively detect a motor current of the left electric motor 43B and a motor current of the right electric motor 43B, and the like, which are built therein. The voltage sensor unit 22, the motor drive circuits 23, and the current sensor units 24 described above are connected to the computation circuit 20.

In this manner, when the application or the release is performed, the determination of the contact and the separation between the disc rotor 4 and the brake pads 33, determination of stop of the drive of each of the electric motors 43B (e.g., determination of the application completion and determination of the release completion), and the like can be performed in the computation circuit 20 of the parking brake control device 19 based on a change in the current of the electric motor 43B. Specifically, the current sensor units 24 construct a detection unit configured to detect the contact or the separation between the brake pads 33 and the disc rotor 4.

In a brake device not including a position sensor configured to detect positions of the brake pads or a thrust-force sensor configured to detect a thrust force, or the like, there is a fear of failing to obtain a positional relationship between the brake pads and the disc rotor, specifically, lowering accuracy of detection of the positions, when the application for applying the braking force and the release for releasing the braking force are performed in short periods (at short intervals). More specifically, in a case where the release request is given before the completion of application or the application request is given before the completion of release, when the electric motor is driven in accordance with the request, there is a fear of lowering accuracy of the determination of the contact and the separation between the brake pads and the disc rotor and the determination of stop of the drive of the electric motor based on the change in motor current of the electric motor. As a result, there is a fear of a shift of the brake pads and the disc rotor from a desired positional relationship.

On the other hand, in the first embodiment, when receiving the second request (application request or release request) within a time period from the start of the execution of the first request (release request or application request) to the detection of the contact or the separation between the brake pads 33 and the disc rotor 4 by the current sensor unit 24 serving as the detection unit, the execution unit of the parking brake control device 19, specifically, the execution unit configured to execute the release request and the application request does not immediately execute the second request. In this case, after the detection of the contact or the separation between the brake pads 33 and the disc rotor 4 by the current sensor unit 24, the execution unit of the parking brake control unit 19 executes the second request. In this manner, the positional relationship between the brake pads 33 and the disc rotor 4 can be regulated (controlled) with high accuracy based on the contact or the separation as a reference without providing the position sensor configured to detect the positions of the brake pads 33 or the thrust-force sensor configured to detect the thrust force, or the like.

Figure 4:
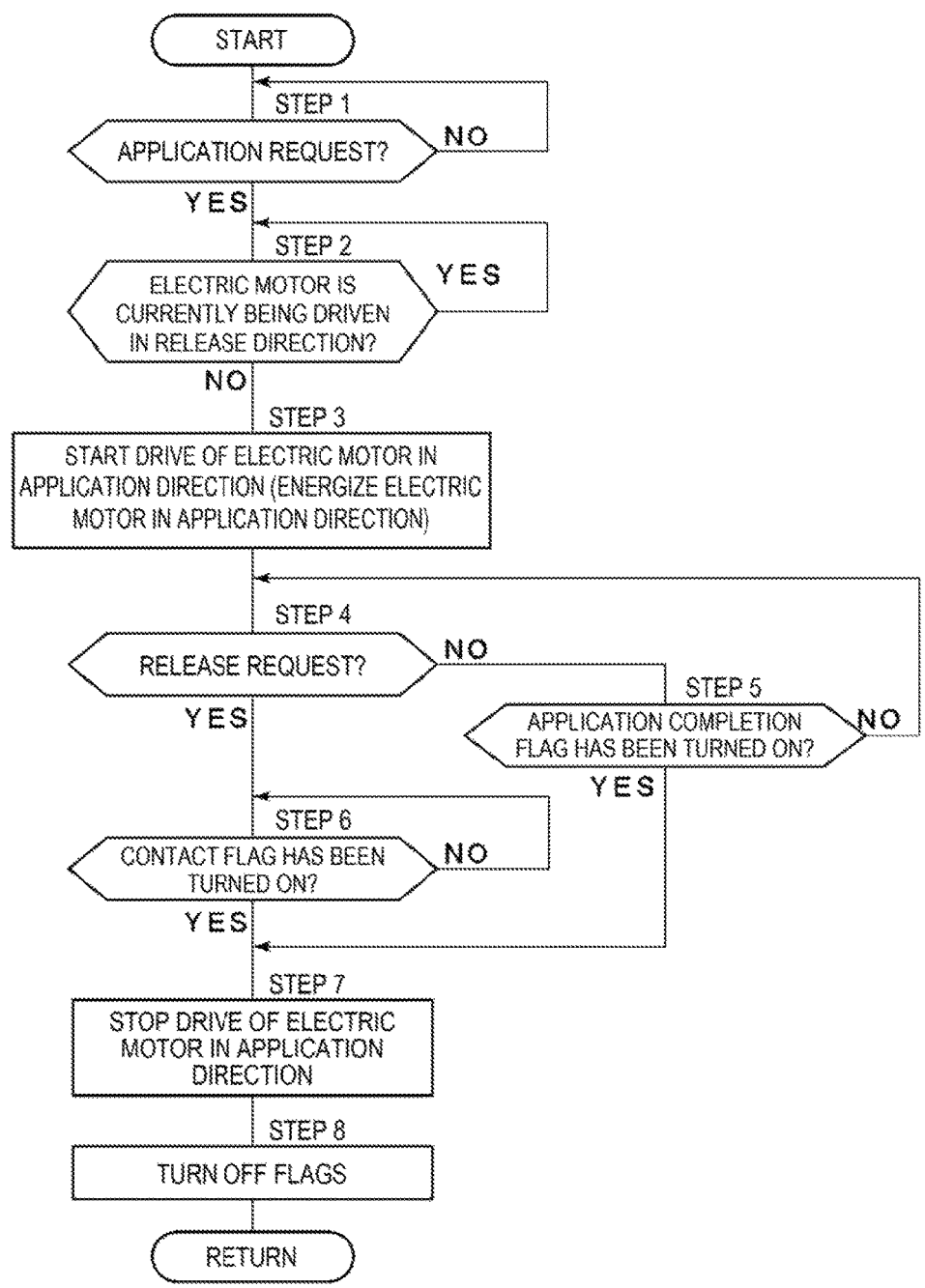
FIG. 4 is a flowchart for illustrating control processing for application (braking application) performed by the parking brake control device.
Figure 5:
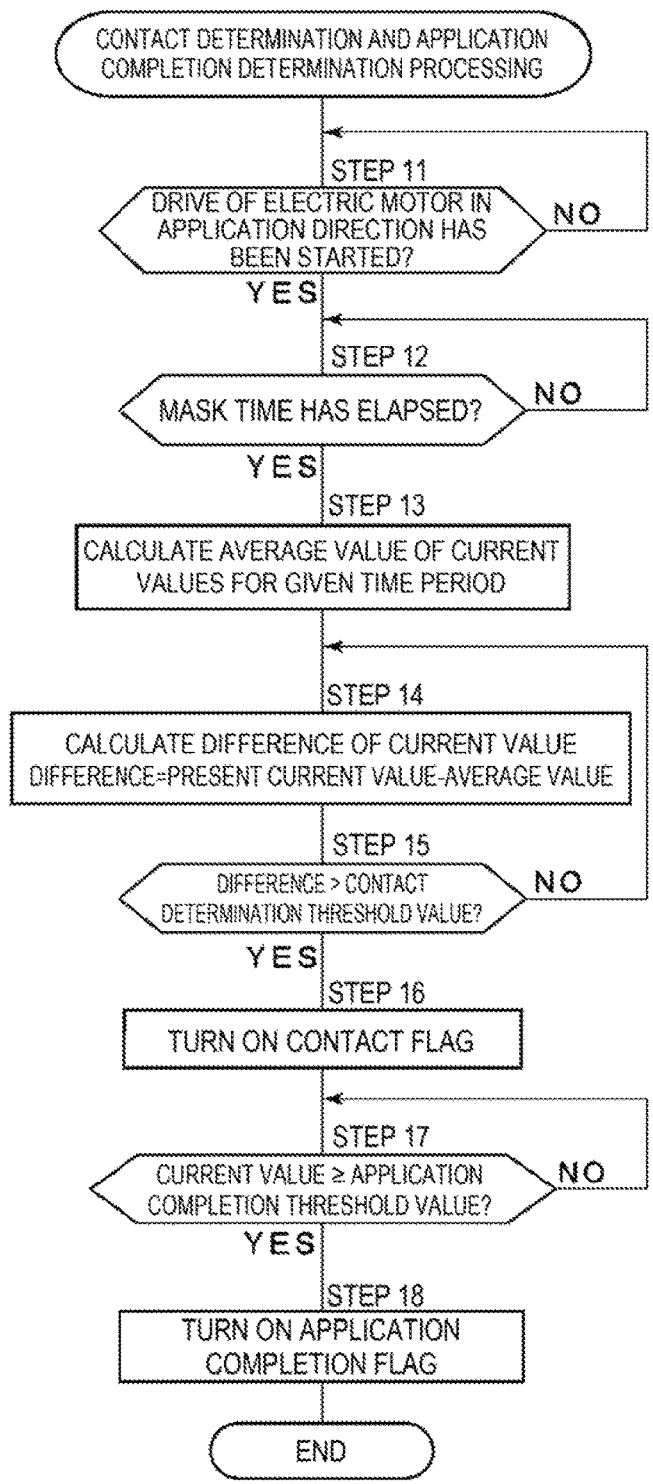
FIG. 5 is a flowchart for illustrating contact determination and application completion determination processing performed by the parking brake control device.

More specifically, when receiving the release request within the time period from the start of execution of the application request to the detection of the contact between the brake pads 33 and the disc rotor 4 by the current sensor unit 24 as illustrated in FIG. 4 referred to later and the like, the parking brake control device 19 inhibits execution of the release request, and executes the release request after the detection of the contact between the brake pads 33 and the disc rotor 4 by the current sensor unit 24 (see Step 5 and the like). In this case, the parking brake control device 19 calculates a difference between an average value of a no-load current flowing after convergence of an inrush current flowing immediately after the start of execution of the application request (immediately after the start of drive of the electric motor 43B) and a present current, and detects the contact of the brake pads 33 and the disc rotor 4 when the difference becomes equal to or larger than a predetermined value, as illustrated in FIG. 5 referred to later (see Step 14 and Step 15).

Figure 6:
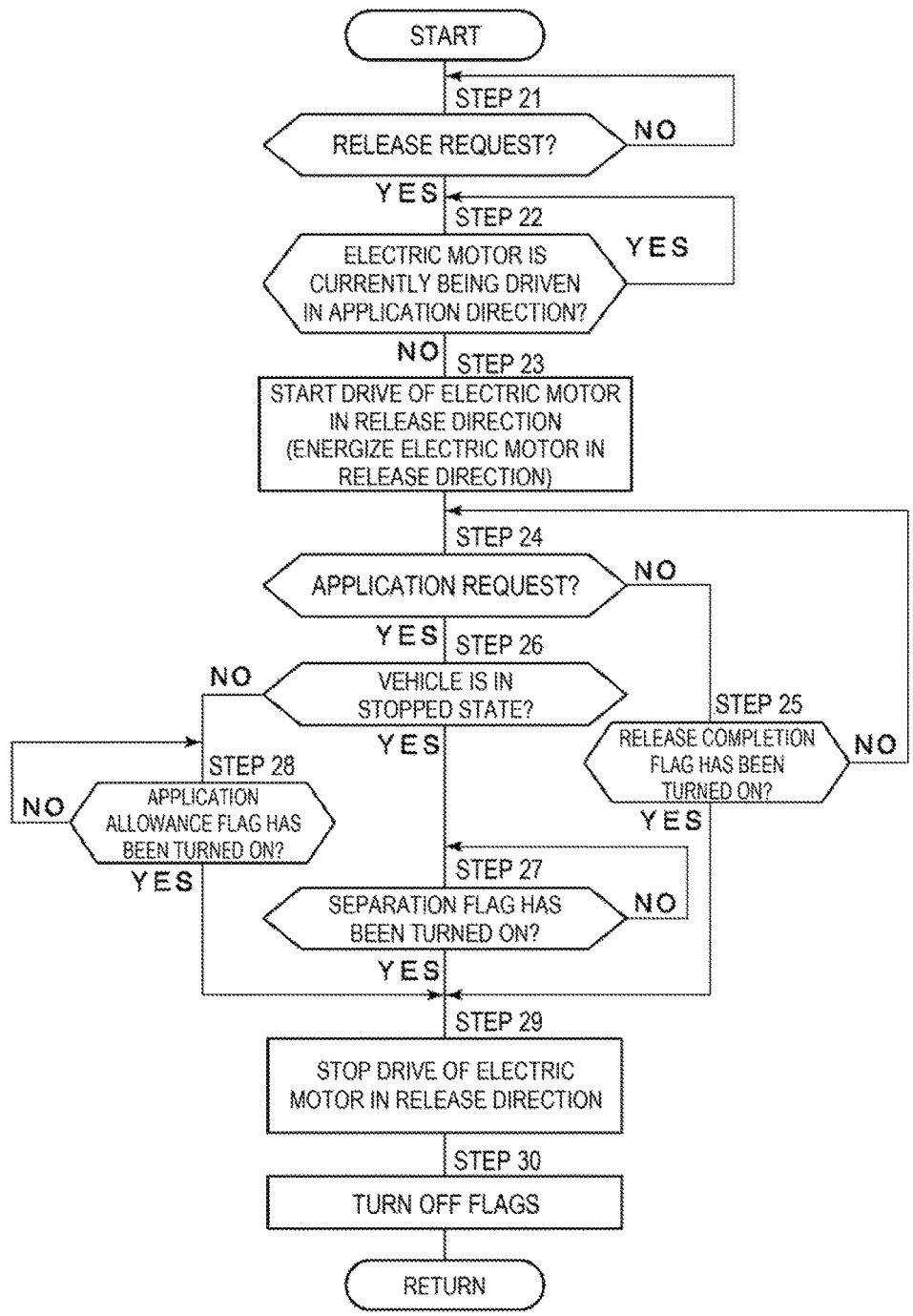
FIG. 6 is a flowchart for illustrating control processing for release (braking release) performed by the parking brake control device.
Figure 7:
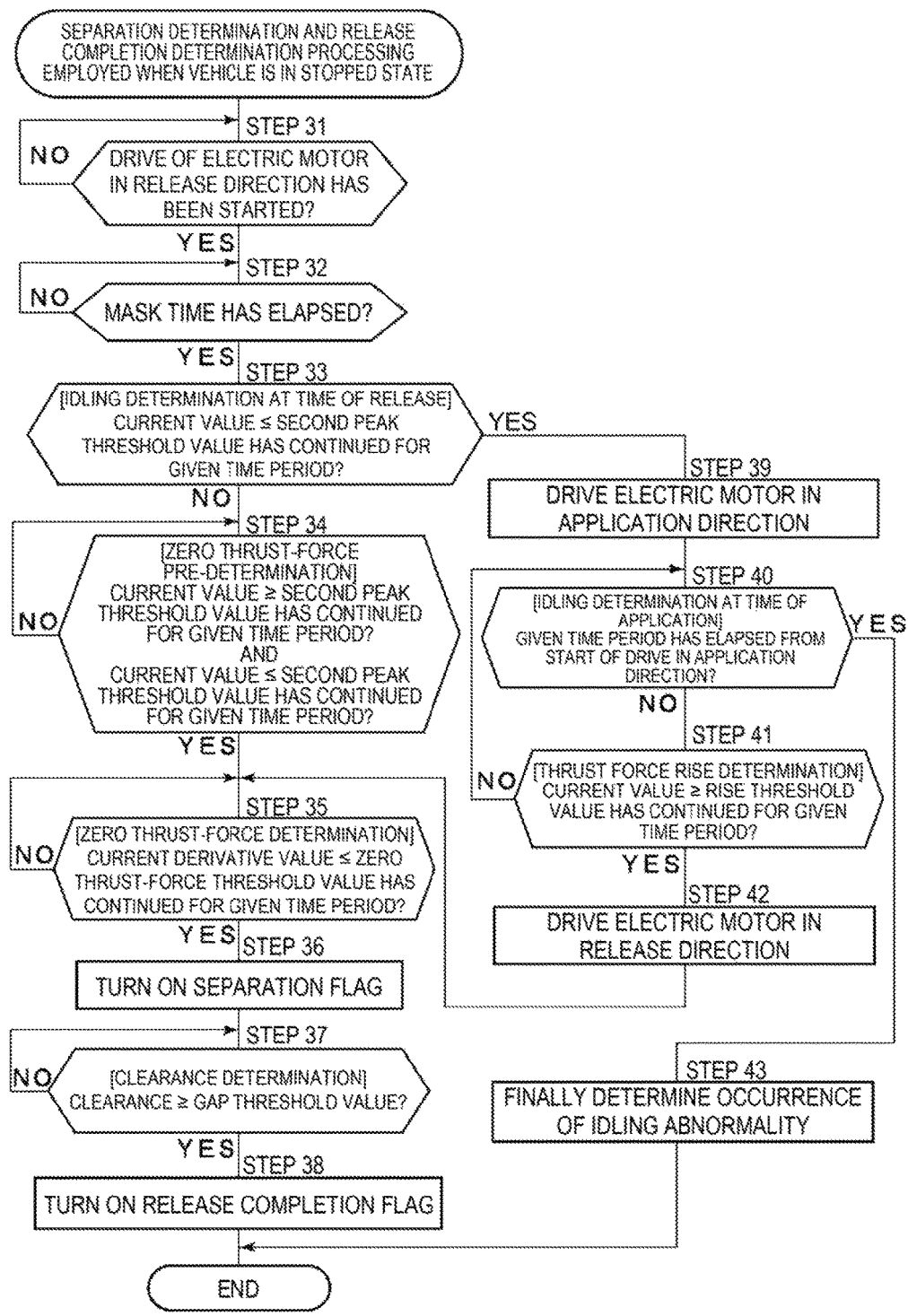
FIG. 7 is a flowchart for illustrating separation determination and release completion determination processing employed when the vehicle is in a stopped state, which is performed by the parking brake control device.
Figure 8:
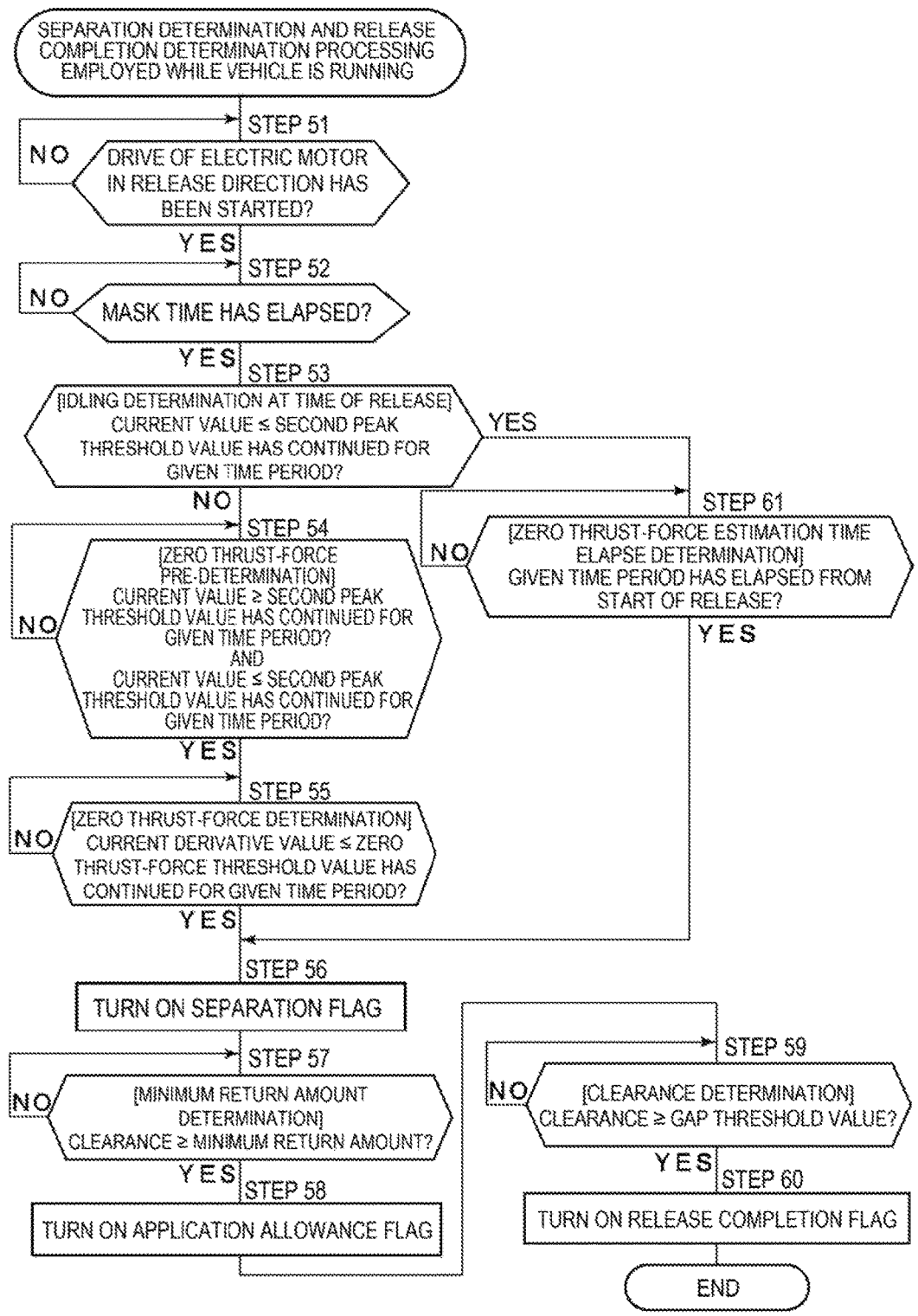
FIG. 8 is a flowchart for illustrating separation determination and release completion determination processing employed while the vehicle is running, which is performed by the parking brake control device.

Meanwhile, when receiving the application request within a time period from the start of execution of the release request to the detection of the separation between the brake pads 33 and the disc rotor 4 by the current sensor unit 24, the parking brake control device 19 inhibits execution of the application request, and executes the application request after the detection of the separation between the brake pads 33 and the disc rotor 4 by the current sensor unit 24, as illustrated in FIG. 6 referred to later and the like (see Step 27 and the like). In this case, when detecting that the present current is lowered to a predetermined current value after the convergence of the inrush current flowing immediately after the start of execution of the release request and a temporal change amount of the present current becomes equal to or smaller than a predetermined change amount after the detection, the parking brake control device 19 detects the separation between the brake pads 33 and the disc rotor 4 as illustrated in FIG. 7 and FIG. 8 referred to later (see Step 34 and Step 35 of FIG. 7 and Step 54 and Step 55 of FIG. 8).

Further, as indicated by the reference symbols "25" and "26" in FIG. 9 and FIG. 13 referred to later, a change (increase and decrease) in the current, which is caused by the inrush current flowing immediate after the start of execution of the release request (immediately after the start of drive of the electric motor 43B), is represented as a first peak 25, and a change (increase and decrease) in the current subsequent to the first peak 25 is represented as a second peak 26. In the present application, the term "peak" means a behavior of the current which is decreased after being temporarily increased. Here, the second peak 26 corresponds to a change in current, for example, which is generated along with transmission of the power of the electric motor 43B to a linearly movable member 42 described later, specifically, start of movement of the linearly movable member 42, after the convergence of the inrush current flowing immediately after the start of drive of the electric motor 43B. In this case, when detecting the separation between the brake pads 33 and the disc rotor 4 without detecting the second peak 26, the parking brake control device 19 (the execution unit thereof) executes the application request independently of the request generated by the request generating unit, as illustrated in FIG. 7 referred to later (see Step 33 and Step 39). As a result, an abnormality regarding whether or not the power (rotation) of the electric motor 43B is transmitted, specifically, whether or not idling is occurring can be determined. The application control processing, the release control processing, the processing of determination of the contact and the separation between the brake pads 33 and the disc rotor 4 described above, and the like, which are performed by the parking brake control device 19, are described later in detail.

Next, a configuration of the disc brakes 31 and 31 having the electric parking brake function, which are provided on the left and right rear wheels 3 and 3 side, is described with reference to FIG. 3. In FIG. 3, only one of the left and right disc brakes 31 and 31, which are provided so as to correspond to the left and right rear wheels 3 and 3, respectively, is illustrated.

The pair of disc brakes 31 provided on the left and right of the vehicle, respectively, are constructed as the hydraulic disc brakes each having the electric parking brake function. The disc brakes 31 construct a brake system (brake device) together with the parking brake control device 19. Each of the disc brakes 31 includes a mounting member 32 to be mounted to a non-rotating portion on the rear wheel 3 side of the vehicle, the inner-side brake pad 33 and the outer-side brake pad 33 serving as pads (frictional members), and the caliper 34 serving as a brake mechanism provided with an electric actuator 43 described later.

In this case, the disc brake 31 thrusts the brake pads 33 by the piston 39 described later with the hydraulic pressure generated based on the operation of the brake pedal 6 or the like to press the brake pads 33 against the disc rotor 4, thereby applying the braking force to the wheel (rear wheel 3). In addition, the disc brake 31 thrusts the piston 39 by the electric motor 43B (through intermediation of the rotation-linear motion conversion mechanism 40) in accordance with the actuation request based on the signal from the parking brake switch 18 or the actuation request based on the above-mentioned application and release determination logics for the parking brake and the ABS control to press the brake pads 33 against the disc rotor 4, thereby applying the braking force to the wheel (rear wheel 3).

The mounting member 32 includes a pair of arm portions (not shown) extending in an axial direction of the disc rotor 4, specifically, a disc axis direction so as to extend over an outer periphery of the disc rotor 4 and being separated away from each other in a disc circumferential direction, a thick supporting portion 32A configured to couple base end sides of the arm portions integrally to each other and fixed to a non-rotating portion of the vehicle at a position on an inner side of the disc rotor 4, and a reinforcing beam 32B configured to couple distal end sides of the arm portions to each other at a position on an outer side of the disc rotor 4.

The inner-side brake pad 33 and the outer-side brake pad 33 are arranged so as to be able to come into contact with both surfaces of the disc rotor 4, and are supported by the respective arm portions of the mounting member 32 so as to be movable in the disc axis direction. The inner-side brake pad 33 and the outer-side brake pad 33 are pressed against the both surface sides of the disc rotor 4 by the caliper 34 (including a caliper main body 35 and the piston 39) described later. In this manner, the brake pads 33 press the disc rotor 4 rotating together with the wheel (rear wheel 3) to thereby apply the braking force to the vehicle.

The caliper 34 serving as a wheel cylinder is arranged on the mounting member 32 so as to extend over an outer peripheral side of the disc rotor 4. The caliper 34 mainly includes the caliper main body 35 supported so as to be movable along the axial direction of the disc rotor 4 relative to each of the arm portions of the mounting member 32, and the piston 39 provided inside the caliper main body 35. The rotation-linear motion conversion mechanism 40 described later and the electric actuator 43 are provided to the caliper 34. The caliper 34 constructs a brake mechanism configured to thrust the brake pads 33 by the piston 39 based on the operation of the brake pedal 6.

The caliper main body 35 includes the cylinder portion 36, a bridge portion 37, and a claw portion 38. The cylinder portion 36 is formed into a bottomed cylindrical shape having one side in the axial direction closed by a partition wall portion 36A, and the other side opposed to the disc rotor 4 being an open end. The bridge portion 37 is formed so as to extend from the cylinder portion 36 in the disc axis direction so as to extend over the outer peripheral side of the disc rotor 4. The claw portion 38 is arranged so as to extend to a side opposite to the cylinder portion 36 through the bridge portion 37 therebetween.

The hydraulic pressure generated along with the depressing operation of the brake pedal 6 is supplied to the cylinder portion 36 of the caliper main body 35 via the brake-side pipe portion 12C or 12D illustrated in FIG. 1. The partition wall portion 36A is formed integrally with the cylinder portion 36 so as to be positioned between the cylinder portion 36 and the electric actuator 43 described later. On an inner peripheral side of the partition wall portion 36A, an output shaft 43C of the electric actuator 43 is rotatably inserted.

Inside the cylinder portion 36 of the caliper main body 35, the piston 39 serving as a pressing member, the rotation-linear motion conversion mechanism 40, and the like are provided. In this embodiment, the rotation-linear motion conversion mechanism 40 is configured so as to be housed inside the piston 39. However, the rotation-linear motion conversion mechanism 40 only needs to be configured to thrust the piston 39 and is not necessarily required to be housed inside the piston 39.

The piston 39 is configured to move the brake pads 33 toward the disc rotor 4 or in a direction away from the disc rotor 4. One axial side being the opening side of the piston 39 is inserted in the cylinder portion 36, whereas the other axial side thereof, which faces the inner-side brake pad 33, is closed by a lid portion 39A. The piston 39 is moved through feeding of the current to the electric actuator 43 (electric motor 43B), and is also moved even through supply of the hydraulic pressure into the cylinder portion 36 based on the depression of the brake pedal 6 or the like. In this case, the movement of the piston 39, which is caused by the electric actuator 43 (electric motor 43B), is performed through application of pushing by the linearly movable member 42 described later. Further, in the cylinder portion 36, the rotation-linear motion conversion mechanism 40 is housed inside the piston 39. The piston 39 is configured to be thrust in the axial direction of the cylinder portion 36 by the rotation-linear motion conversion mechanism 40.

The rotation-linear motion conversion mechanism 40 constructs the pressing-member retaining mechanism, and thrusts the piston 39 of the caliper 34 by an external force, specifically, the electric actuator 43 (electric motor 43B) independently of the application of the hydraulic pressure into the cylinder portion 36, and retains the thrust piston 39 and the brake pads 33. In this manner, the parking brake is brought into the applied state (retained state). Meanwhile, the rotation-linear motion conversion mechanism 40 causes the piston 39 to retract by the electric actuator 43 (electric motor 43B) in a direction opposite to the thrust direction to bring the parking brake into the release state (released state). Then, the left and right disc brakes 31 are provided so as to correspond to the left and right rear wheels 3, respectively, and therefore the rotation-linear motion conversion mechanisms 40 and the electric actuators 43 are also provided on the left and right of the vehicle, respectively.

The rotation-linear motion conversion mechanism 40 includes a thread member 41 having a bar-like body on which a male thread, for example, a trapezoidal thread is formed, and the linearly movable member 42 having a female thread hole formed by the trapezoidal thread on an inner peripheral side. The linearly movable member 42 serves as a driven member (thrust member) to be moved toward the piston 39 or in a direction away from the piston 39 by the electric actuator 43 (electric motor 43B). Specifically, the thread member 41 threadably fitted to the inner peripheral side of the linearly movable member 42 constructs a thread mechanism configured to convert a rotational motion of the electric actuator 43 described later into a linear motion of the linearly movable member 42. In this case, the female thread of the linearly movable member 42 and the male thread of the thread member 41 are formed using a thread having a large irreversibility, which is the trapezoidal thread in the first embodiment, thereby constructing the pressing-member retaining mechanism.

The pressing-member retaining mechanism (rotation-linear motion conversion mechanism 40) is configured to retain the linearly movable member 42, specifically, the piston 39 at a suitable position by a frictional force (retention force) even under a state in which the feeding of power to the electric motor 43B is stopped. The pressing-member retaining mechanism only needs to retain the piston 39 at the position thrust by the electric actuator 43 (electric motor 43B), and may be, for example, a general screw having a triangular cross section or a worm gear, with a large irreversibility other than the trapezoidal thread.

The thread member 41 provided so as to be threadably fitted on the inner peripheral side of the linearly movable member 42 includes a flange portion 41A being a flange portion having a large diameter on one axial side. The other axial side of the thread member 41 extends toward the lid portion 39A of the piston 39. The thread member 41 is coupled integrally with the output shaft 43C of the electric actuator 43, which is described later, on the flange portion 41A side. Further, on an outer peripheral side of the linearly movable member 42, an engagement projecting portion 42A, which is configured to allow relative movement of the linearly movable member 42 in the axial direction while preventing rotation (restricting relative rotation) of the linearly movable member 42 relative to the piston 39, is provided.

The electric actuator 43 is fixed to the caliper main body 35 of the caliper 34. The electric actuator 43 actuates (applies or releases) the disc brake 31 based on the actuation request signal from the parking brake switch 18, the application and release determination logics for the parking brake, and the ABS control described above. The electric actuator 43 includes a casing 43A mounted on an outer side of the partition wall portion 36A, the electric motor 43B, which is positioned inside the casing 43A and includes a stator, a rotor, and the like to move the piston 39 with the feeding of power, a speed reducer (not shown) configured to amplify a torque from the electric motor 43B, and the output shaft 43C configured to output the rotation torque after the amplification by the speed reducer. The output shaft 43C extends to pass through the partition wall portion 36A of the cylinder portion 36 in the axial direction and is coupled to the flange portion 41A side of the thread member 41 inside the cylinder portion 36 so as to rotate integrally therewith.

Coupling means between the output shaft 43C and the thread member 41 can be constructed, for example, so as to be movable in the axial direction and be prevented from being rotated in a rotating direction. In this case, a publicly-known technology, for example, spline fitting or fitting with a polygonal column (non-circular fitting) is used. As the speed reducer, for example, a planetary gear speed reducer, a worm gear speed reducer, or the like may be used. When a publicly-known speed reducer without reverse operationality (with irreversibility) such as the worm gear speed reducer is used, a publicly-known mechanism with reversibility such as a ball screw or a ball-and-ramp mechanism can be used as the rotation-linear motion conversion mechanism 40. In this case, the pressing-member retaining mechanism can be constructed by, for example, a reversible rotation-linear motion conversion mechanism and an irreversible speed reducer.

When the driver operates the parking brake switch 18 illustrated in FIG. 1 to FIG. 3, the power is fed to the electric motor 43B via the parking brake control device 19 to rotate the output shaft 43C of the electric actuator 43. Therefore, the thread member 41 of the rotation-linear motion conversion mechanism 40 is rotated integrally with the output shaft 43C, for example, in one direction to thrust (drive) the piston 39 via the linearly movable member 42 toward the disc rotor 4. As a result, the disc rotor 4 is sandwiched between the inner-side brake pad 33 and the outer-side brake pad 33 to bring the disc brake 31 into a state in which the braking force is applied as the electric parking brake, specifically, the applied state (retained state).

Meanwhile, when the parking brake switch 18 is operated to the braking release side, the thread member 41 of the rotation-linear motion conversion mechanism 40 is rotationally driven in another direction (opposite direction) by the electric actuator 43. As a result, the linearly movable member 42 is driven in the direction away from (separating from) the disc rotor 4 via the rotation-linear motion conversion mechanism 40 to bring the disc brake 31 into a state in which the application of the braking force as the parking brake is released, that is, a released state (release state).

In this case, in the rotation-linear motion conversion mechanism 40, when the thread member 41 is rotated relative to the linearly movable member 42, the rotation of the linearly movable member 42 is restricted inside the piston 39. Therefore, the linearly movable member 42 is moved relatively in the axial direction in accordance with an angle of rotation of the thread member 41. In this manner, the rotation-linear motion conversion mechanism 40 converts the rotational motion into the linear motion so that the piston 39 is thrust by the linearly movable member 42. Further, along therewith, the rotation-linear motion conversion mechanism 40 retains the linearly movable member 42 at a suitable position with a frictional force generated between the linearly movable member 42 and the thread member 41, thereby retaining the piston 39 and the brake pads 33 at positions after the thrust by the electric actuator 43.

On the partition wall portion 36A of the cylinder portion 36, a thrust bearing 44 is provided between the partition wall portion 36A and the flange portion 41A of the thread member 41. The thrust bearing 44 receives application of a thrust load from the thread member 41 together with the partition wall portion 36A so as to smoothen the rotation of the thread member 41 relative to the partition wall portion 36A. Further, a sealing member 45 is provided between the partition wall portion 36A of the cylinder portion 36 and the output shaft 43C of the electric actuator 43. The sealing member 45 seals between the partition wall portion 36A and the output shaft 43C so as to prevent the brake fluid inside the cylinder portion 36 from leaking to the electric actuator 43 side.

On an open end side of the cylinder portion 36, there are provided a piston seal 46 and a dust boot 47. The piston seal 46 serves as an elastic seal configured to seal between the cylinder portion 36 and the piston 39. The dust boot 47 is configured to prevent entry of a foreign matter into the cylinder portion 36. The dust boot 47 is a bellows-shaped sealing member having flexibility, and is mounted between the open end of the cylinder portion 36 and an outer periphery of the piston 39 on a side closer to the lid portion 39A.

Each of the disc brakes 5 for the front wheels 2 has a configuration which is approximately the same as that of each of the disc brakes 31 for the rear wheels 3 except for the parking brake mechanism. Specifically, each of the disc brakes 5 for the front wheels 2 does not include the rotation-linear motion conversion mechanism 40, the electric actuator 43, and the like, which actuate (apply and release) the parking brake and are included in each of the disc brakes 31 for the rear wheels 3. Otherwise, however, the disc brakes 5 for the front wheels 2 are configured approximately the same as the disc brakes 31. In place of the disc brakes 5, however, the disc brakes 31, each having the electric parking brake function, may be provided for the front wheels 2 in some cases.

In this embodiment, the disc brakes 31, each including the hydraulic caliper 34 provided with the electric actuator 43, have been described as an example. However, the present invention is not limited thereto. A configuration of each of the disc brakes is not required to be the brake mechanisms of this embodiment described above, and may be, for example, an electric disc brake having an electric caliper, an electric drum brake configured to press shoes against a drum by an electric actuator to apply the braking force, a disc brake including an electric drum-type parking brake, or a configuration for actuating to apply the parking brake by pulling a cable by an electric actuator, as long as the brake mechanism is capable of pressing (thrusting) the pads (including the shoes) against the rotor (including the drum) based on the drive of the electric actuator (electric motor) to retain a pressing force.

The brake device for a four-wheeled automobile according to this embodiment has the configuration described above. Next, actuation thereof is described.

When the driver of the vehicle performs the depressing operation of the brake pedal 6, the depressing force is transmitted to the master cylinder 8 via the booster 7 to generate the brake hydraulic pressure by the master cylinder 8. The hydraulic pressure generated in the master cylinder 8 is distributed and supplied to the respective disc brakes 5 and 31 via the cylinder-side hydraulic pressure pipes 10A and 10B, the ESC 11, and the brake-side pipe portions 12A, 12B, 12C, and 12D, thereby applying the braking forces to the left and right front wheels 2 and the left and right rear wheels 3.

In this case, referring to the disc brakes 31 for the rear wheels 3, the hydraulic pressures are respectively supplied into the cylinder portion 36 of the caliper 34 via the brake-side pipe portions 12C and 12D. In accordance with an increase in hydraulic pressure inside the cylinder portion 36, the piston 39 is displaced in a sliding manner toward the inner-side brake pad 33. As a result, the piston 39 presses the inner-side brake pad 33 toward one side surface of the disc rotor 4. Through a reaction force generated at this time, the entire caliper 34 is displaced in a sliding manner toward the inner side of the disc rotor 4 relative to each of the arm portions of the mounting member 32.

As a result, the outer leg portion (claw portion 38) of the caliper 34 operates so as to press the outer-side brake pad 33 against the disc rotor 4, and hence the disc rotor 4 is sandwiched between the pair of brake pads 33 from both sides in the axial direction. As a result, the braking force based on the applied hydraulic pressure is generated. Meanwhile, when the brake operation is released, the supply of the hydraulic pressure into the cylinder portion 36 is canceled and stopped, thereby displacing the piston 39 into the cylinder portion 36 in a retracting manner. As a result, the inner-side brake pad 33 and the outer-side brake pad 33 are separated from the disc rotor 4 to return the vehicle into a non-braked state.

Next, when the driver operates the parking brake switch 18 to the braking side (ON), the feeding of power to the electric motor 43B of the disc brake 31 is performed from the parking brake control device 19 to rotationally drive the output shaft 43C of the electric actuator 43. The disc brake 31 having the electric parking brake function converts the rotation of the electric actuator 43 into the linear motion via the thread member 41 of the rotation-linear motion conversion mechanism 40 and the linearly movable member 42 to move the linearly movable member 42 in the axial direction, thereby thrusting the piston 39. As a result, the pair of brake pads 33 is pressed against the both surfaces of the disc rotor 4.

At this time, the linearly movable member 42 is retained in a braking state by the frictional force (retention force) generated with the thread member 41 having a normal force being a pressing reaction force transmitted from the piston 39. The disc brakes 31 for the rear wheels 3 are actuated (applied) as the parking brakes. Specifically, even after the feeding of power to the electric motor 43B is stopped, the linearly movable member 42 and eventually the piston 39 are retained at the braking position by the female thread formed on the linearly movable member 42 and the male thread formed on the thread member 41.

Meanwhile, when the driver operates the parking brake switch 18 to the braking release side (OFF), the power is fed to the electric motor 43B from the parking brake control device 19 so that the motor is reversely rotated. The output shaft 43C of the electric actuator 43 is rotated in a direction opposite to that during the actuation (application) of the parking brake. At this time, the retention of the braking force by the thread member 41 and the linearly movable member 42 is released. The rotation-linear motion conversion mechanism 40 moves the linearly movable member 42 in a return direction, specifically, into the cylinder portion 36 by the amount of movement corresponding to the amount of reverse rotation of the electric actuator 43, thereby releasing the braking force of the parking brake (disc brake 31).

Next, control processing performed in the computation circuit 20 of the parking brake control device 19 is described referring to FIG. 4 to FIG. 8. The application control processing illustrated in FIG. 4 and the release control processing illustrated in FIG. 6 are repeatedly executed in predetermined control periods, specifically, for each predetermined time (for example, 10 ms) while the parking brake control device 19 is energized.

First, the control processing performed by the parking brake control device 19 in the case of application is described referring to FIG. 4 and FIG. 5.

For example, after a processing operation illustrated in FIG. 4 is started based on system activation (activation of a vehicle system or activation of the parking brake control device 19), for example, accessory ON, ignition ON, or power ON through an operation performed by the driver, the computation circuit 20 determines whether or not the application request has been given by the parking brake switch 18 or based on the determination logics described above or the ABS control in Step 1. Specifically, in Step 1, whether or not the application request generated by the request generating unit has been given is determined. When it is determined as "NO", specifically, no application request has been given in Step 1, the processing returns to before Step 1 to repeat the processing in Step 1. On the other hand, when it is determined as "YES", specifically, the application request has been given in Step 1, the processing proceeds to Step 2.

In Step 2, it is determined whether or not the electric motor 43B is currently being driven in a release direction. When it is determined as "NO", specifically, the electric motor 43B is not currently being driven in the release direction in Step 2, the processing proceeds to processing in subsequent Step 3. On the other hand, when it is determined as "YES", specifically, the electric motor 43B is currently being driven in the release direction in Step 2, the processing returns to before Step 2 to repeat the processing in Step 2, specifically, waits for stop of the electric motor 43B. The reason for this is as follows. When the electric motor 43B is currently being driven in the release direction, after the drive is stopped, specifically, the drive of the electric motor 43B is stopped based at least on turning on of a separation flag or turning on of an application allowance flag described later, the processing in Step 3 is performed and drive of the electric motor 43B in an application direction is started.

In Step 3, the electric motor 43B is driven in an application direction (energized in the application direction). Then, the processing proceeds to Step 4. In Step 4, whether or not the release request has been given by the parking brake switch 18 or based on the determination logics described above or the ABS control is determined. Specifically, in Step 4, whether or not the release request generated by the request generating unit has been given is determined. When it is determined as "NO", specifically, no release request has been given in Step 4, the processing proceeds to Step 5. In Step 5, it is determined whether or not the application completion flag has been turned on through contact determination and application completion determination processing illustrated in FIG. 5, which is described later. When it is determined as "NO", specifically, the application completion flag has not been turned on (is still off) in Step 5, the processing returns to before Step 4 to repeat the processing of Step 4 and subsequent steps.

Meanwhile, when it is determined as "YES", specifically, the release request has been given in Step 4, the processing proceeds to Step 6. In this case, there is a possibility of reception of the release request within a time period from the start of execution of the application request to the achievement of contact between the brake pads 33 and the disc rotor 4. Therefore, in order to prevent immediate execution of the release request in this case, the processing proceeds to Step 6 where it is determined whether or not the brake pads 33 and the disc rotor 4 have been brought into contact with each other. Specifically, it is determined whether or not the contact flag has been turned on through the contact determination and application completion determination processing illustrated in FIG. 5, which is described later. When it is determined as "NO", specifically, the contact flag has not been turned on (is still off) in Step 6, the processing returns to before Step 6 to repeat the processing in Step 6.

When it is detected (determined) as "YES", specifically, the contact flag has been turned on, that is, the brake pads 33 and the disc rotor 4 have been brought into contact with each other in Step 6, the processing proceeds to Step 7 where the drive of the electric motor 43B which is currently being driven in the application direction is stopped. On the other hand, even when it is determined as "YES", specifically, the application completion flag has been turned on, that is, a braking force obtained based on the drive of the electric motor 43B has become equal to a braking force necessary to stop the vehicle in Step 5, the processing proceeds to Step 7 where the drive of the electric motor 43B which is currently being driven in the application direction is stopped. In Step 8 subsequent to Step 7, the flag is turned off, that is, the contact flag is turned off, and when the application completion flag is ON, the application completion flag is also turned off. Then, the processing returns to START Step through RETURN Step to repeat the processing of Step 1 and subsequent steps.

Next, the contact determination and application completion determination processing illustrated in FIG. 5, which is performed in parallel to the application control processing illustrated in FIG. 4, is described. In the determination processing illustrated in FIG. 5, determination of whether or not the brake pads 33 and the disc rotor 4 have been brought into contact with each other (contact determination) and determination of whether or not the electric motor 43B has been driven until a force (thrust force) of the brake pads 33 for pressing the disc rotor 4 becomes equal to a thrust force necessary to maintain the vehicle in the stopped state (=thrust force necessary as the parking brake) (application completion determination) are performed based on the current of the electric motor 43B, which is detected by the current sensor unit 24. In the determination processing illustrated in FIG. 5, when it is determined that the brake pads 33 and the disc rotor 4 have been brought into contact with each other, the contact flag is turned on. When it is determined that the electric motor 43B has been driven until the thrust force necessary to maintain the vehicle in the stopped state is achieved, that is, the braking force based on the drive of the electric motor 43B has become equal to the braking force necessary to stop the vehicle, the application completion flag is turned on.

Specifically, when the processing operation illustrated in FIG. 5 is started based on the system activation (activation of the vehicle system or activation of the parking brake control device 19), for example, accessory ON, ignition ON, or power ON, the computation circuit 20 determines whether or not the drive of the electric motor 43B in the application direction has been started in Step 11. When it is determined as "YES", specifically, the drive of the electric motor 43B in the application direction has been started in Step 11, the processing proceeds to Step 12. On the other hand, when it is determined as "NO", specifically, the drive of the electric motor 43B in the application direction has not been started, for example, the electric motor 43B is in a stopped state or is driven in the release direction in Step 11, the processing returns to before Step 11 to repeat the processing in Step 11, specifically, waits for the start of the drive of the electric motor 43B in the application direction. The reason for this is because the processing of Step 12 and subsequent steps, specifically, the contact determination and the application completion determination are to be started simultaneously with the start of the drive of the electric motor 43B in the application direction.

After the drive of the electric motor 43B in the application direction is started, that is, it is determined as "YES" in Step 11, determination of elapse of mask time (mask determination) is performed in Step 12. The determination of elapse of the mask time is performed so as to wait for convergence of an inrush current 27 (see FIG. 9 to FIG. 13 referred to later) flowing immediately after the start of drive of the electric motor 43B for the contact determination and the application completion determination based on the current of the electric motor 43B, which is detected by the current sensor unit 24. Specifically, the mask time is waiting time for the convergence of the inrush current 27.

When it is determined as "NO", specifically, the mask time (waiting time) has not elapsed in Step 12, the processing returns to before Step 12 to repeat the processing in Step 12. On the other hand, when it is determined as "YES", specifically, the mask time has elapsed in Step 12, the processing proceeds to Step 13. In Step 13, an average value of the no-load current after elapse of the mask time is calculated. Specifically, in Step 13, the average value of the current value within a preset given time period after the elapse of the mask time is calculated. The calculation can be achieved by, for example, detecting the current value for a predetermined number of times at predetermined intervals and calculating an average value of the detected values. The given time period, the predetermined interval, and the predetermined number of times are preset so that accuracy of the average value can be ensured.

After the average value of the current values within the given time period is calculated in Step 13, the processing proceeds to Step 14 where a difference between the current values is calculated. Specifically, in Step 14, the average value calculated in Step 13 is subtracted from a present detection value to calculate a difference between the present value and the average value. Then, in subsequent Step 15, it is determined whether or not the difference calculated in Step 14 is larger than a preset contact determination threshold value. The contact determination threshold value serves as a determination value for determining whether or not the brake pads 33 and the disc rotor 4 have been brought into contact with each other. Specifically, when the brake pads 33 and the disc rotor 4 start coming into contact with each other, the current of the electric motor 43B increases. Then, when the current increases, the difference between the average value obtained in Step 13 and the present current value increases. Therefore, when the difference calculated in Step 14 becomes larger than the contact determination threshold value, it is determined in Step 15 that the brake pads 33 and the disc rotor 4 have been brought into contact with each other. In this case, the contact determination threshold value is obtained in advance through an experiment, a simulation, a calculation, or the like to be stored in the storage unit 21 so that whether or not the brake pads 33 and the disc rotor 4 have been brought into contact with each other can be appropriately determined.

When it is determined as "NO", specifically, the difference is equal to or smaller than the contact determination threshold value in Step 15, it is considered that the brake pads 33 and the disc rotor 4 have not been brought into contact with each other yet. Therefore, the processing returns to before Step 14 to repeat the processing of Step 14 and subsequent steps. Meanwhile, when it is determined as "YES", specifically, the difference is larger than the contact determination threshold value in Step 15, it is considered that the brake pads 33 and the disc rotor 4 have been brought into contact with each other. In this case, the processing proceeds to Step 16 to turn on the contact flag. In this manner, in the contact determination processing illustrated in FIG. 5, the difference between the average value of the no-load current flowing after the convergence of the inrush current 27 and the present current is calculated. When the difference becomes equal to or larger than the predetermined value (contact determination threshold value), the contact between the brake pads 33 and the disc rotor 4 is detected so as to turn on the contact flag.

The detection of the contact between the brake pads 33 and the disc rotor 4 includes detection of the position of the linearly movable member 42 driven by the electric motor 43B, which is moved to a position corresponding to a position where the brake pads 33 and the disc rotor 4 are brought into contact with each other. Specifically, the parking brake control device 19 detects the contact between the brake pads 33 and the disc rotor 4 based on the processing in Step 15 of FIG. 5, specifically, a change in current of the electric motor 43B, which is detected by the current sensor unit 24, that is, the difference which has become equal to or larger than the predetermined value. In this case, for example, when the brake pedal 6 is being depressed, specifically, when the piston 39 is displaced (thrust) based on the supply of the hydraulic pressure to the disc brake 31, more specifically, the contact between the brake pads 33 and the disc rotor 4 has already been achieved based on the displacement of the piston 39, at the start of drive of the electric motor 43B in the application direction, there is a possibility in that timing (time) at which the brake pads 33 and the disc rotor 4 are brought into contact with each other and timing (time) at which the current changes, that is, the difference becomes equal to or larger than the predetermined value, do not correspond to each other in one-by-one fashion. The same applies to the detection of separation between the brake pads 33 and the disc rotor 4.

Therefore, in this embodiment, the contact or the separation between the brake pads 33 and the disc rotor 4 is detected in consideration of the displacement of the piston 39, which is detected based on the hydraulic pressure. Specifically, for example, when the brake pads 33 and the disc rotor 4 have already been brought into contact with each other based on the supply of the hydraulic pressure prior to the drive of the electric motor 43B in the application direction, the detection of the change in current of the electric motor 43B, specifically, the difference which has become equal to or larger than the predetermined value, is equivalent to the detection of the contact between the linearly movable member 42 driven by the electric motor 43B and the piston 39. In this case, the detection is equivalent to the detection of the contact between the brake pads 33 and the disc rotor 4. Specifically, when a high hydraulic pressure is applied to the piston 39, the contact between the brake pads 33 and the disc rotor 4 can be detected based on the change in current, which is caused by the contact of the linearly movable member 42 with the piston 39. In any of the cases, specifically, regardless of whether or not the hydraulic pressure is supplied, when it is determined as "YES" in Step 15, it is considered that the brake pads 33 and the disc rotor 4 have been brought into contact with each other or the linearly movable member 42 and the piston 39 have been brought into contact with each other. Therefore, the processing proceeds to Step 16 to turn on the contact flag.

In Step 17 subsequent to Step 16, it is determined whether or not the current value of the electric motor 43B has become equal to or larger than a preset application completion threshold value. As indicated by the reference symbol "28" in FIG. 9 to FIG. 11 and FIG. 13, an application completion threshold value 28 serves as a determination value for determining whether or not the electric motor 43B has been driven until the force (thrust force) for pressing the piston 39 with the linearly movable member 42, that is, the force (thrust force) of the brake pads 33 for pressing the disc rotor 4 becomes equal to a thrust force necessary to maintain the vehicle in the stopped state (=thrust force necessary as the parking brake). The application completion threshold value 28 is obtained in advance through an experiment, a simulation, a calculation, or the like to be stored in the storage unit 21 so that the drive of the electric motor 43B can be stopped at appropriate timing based on a relationship between the current value and the thrust force.

When it is determined as "NO", specifically, the current value of the electric motor 43B has not become equal to or larger than the application completion threshold value 28 in Step 17, the processing returns to before Step 17 to repeat the processing in Step 17. When it is determined as "YES", specifically, the current value of the electric motor 43B has become equal to or larger than the application completion threshold value 28 in Step 17, the processing proceeds to Step 18 to turn on the application completion flag. In the application control processing illustrated in FIG. 4, the drive of the electric motor 43B, which has been started in the application direction, is stopped on condition that the contact flag is turned on or the application completion flag is turned on.

Next, the control processing performed by the parking brake control device 19 in the case of release is described referring to FIG. 6 to FIG. 8.

Similarly to the application control processing illustrated in FIG. 6, for example, after a processing operation illustrated in FIG. 6 is started based on system activation (activation of a vehicle system or activation of the parking brake control device 19), for example, accessory ON, ignition ON, or power ON through an operation performed by the driver, the computation circuit 20 determines whether or not the release request has been given by the parking brake switch 18 or based on the determination logics described above or the ABS control in Step 21. Specifically, in Step 21, whether or not the release request generated by the request generating unit has been given is determined. When it is determined as "NO", specifically, no release request has been given in Step 21, the processing returns to before Step 21 to repeat the processing in Step 21. On the other hand, when it is determined as "YES", specifically, the release request has been given in Step 21, the processing proceeds to Step 22.

In Step 22, it is determined whether or not the electric motor 43B is currently being driven in an application direction. When it is determined as "NO", specifically, the electric motor 43B is not currently being driven in the application direction in Step 22, the processing proceeds to processing in subsequent Step 23. On the other hand, when it is determined as "YES", specifically, the electric motor 43B is currently being driven in the application direction in Step 22, the processing returns to before Step 22 to repeat the processing in Step 22, specifically, waits for stop of the electric motor 43B. The reason for this is as follows. When the electric motor 43B is currently being driven in the application direction, after the drive is stopped, specifically, the drive of the electric motor 43B is stopped based at least on turning on of the contact flag, the processing in Step 23 is performed and drive of the electric motor 43B in a release direction is started.

In Step 23, the electric motor 43B is driven in a release direction (energized in the release direction). Then, the processing proceeds to Step 24. In Step 24, whether or not the application request has been given by the parking brake switch 18 or based on the determination logics described above or the ABS control is determined. Specifically, in Step 24, whether or not the application request generated by the request generating unit has been given is determined. When it is determined as "NO", specifically, no application request has been given in Step 24, the processing proceeds to Step 25. In Step 25, it is determined whether or not the release completion flag has been turned on through separation determination and release completion determination processing illustrated in FIG. 7 or FIG. 8, which is described later. When it is determined as "NO", specifically, the release completion flag has not been turned on (is still off) in Step 25, the processing returns to before Step 24 to repeat the processing of Step 24 and subsequent steps.

Meanwhile, when it is determined as "YES", specifically, the application request has been given in Step 24, the processing proceeds to Step 26. In this case, there is a possibility of reception of the application request within a time period from the start of execution of the release request to the achievement of separation between the brake pads 33 and the disc rotor 4 or to achievement of a clearance equal to or larger than a minimum return amount. Therefore, in order to prevent the application request from being immediately executed in this case, the processing in Step 26 and processing in Step 27 or Step 28 subsequent thereto is performed. Specifically, in Step 26, whether or not the vehicle is in the stopped state is determined. The determination can be performed, for example, based on the detection value of the velocity sensor (vehicle-velocity sensor or wheel-velocity sensors) mounted to the vehicle.

When it is determined as "YES", specifically, the vehicle is in the stopped state in Step 26, the processing proceeds to Step 27 to determine whether or not the brake pads 33 and the disc rotor 4 have been separated from each other. Specifically, it is determined whether or not the separation flag has been turned on as a result of the separation determination and release completion determination processing illustrated in FIG. 7 or FIG. 8 referred to later. When it is determined as "NO", specifically, the separation flag has not been turned on (is still off) in Step 27, the processing returns to before Step 27 to repeat the processing in Step 27. When it is detected (determined) as "YES", specifically, the separation flag has been turned on, that is, the brake pads 33 and the disc rotor 4 have been separated from each other in Step 27, the processing proceeds to Step 29 to stop the drive of the electric motor 43B which is currently being driven in the release direction.

On the other hand, when it is determined as "NO", specifically, the vehicle is not in the stopped state (is currently running) in Step 26, the processing proceeds to Step 28 to determine whether or not a clearance (gap) equal to or larger than the minimum return amount is ensured between the brake pads 33 and the disc rotor 4. Specifically, it is determined whether or not the application allowance flag has been turned on as a result of the separation determination and release completion determination processing illustrated in FIG. 8, which is referred to later. When it is determined as "NO", specifically, the application allowance flag has not been turned on (is still off) in Step 28, the processing returns to before Step 28 to repeat the processing in Step 28. When it is detected (determined) as "YES", specifically, the application allowance flag has been turned on, specifically, the clearance equal to or larger than the minimum return amount is ensured between the brake pads 33 and the disc rotor 4 in Step 28, the processing proceeds to Step 29 to stop the drive of the electric motor 43B which is currently being driven in the release direction.

Further, even when it is determined as "YES", specifically, the release completion flag has been turned on, that is, a clearance equal to or larger than a gap threshold value is ensured between the brake pads 33 and the disc rotor 4 in Step 25, the processing proceeds to Step 29 where the drive of the electric motor 43B which is currently being driven in the release direction is stopped. In Step 30 subsequent to Step 29, the flag is turned off, that is, the separation flag is turned off, when the application allowance flag is ON, the application allowance flag is also turned off, and when the release completion flag is ON, the release completion flag is also turned off. Then, the processing returns to START Step through RETURN Step to repeat the processing of Step 21 and subsequent steps.

Next, the separation determination and release completion determination processing illustrated in FIG. 7 and FIG. 8, which is performed in parallel to the application control processing illustrated in FIG. 6, is described. In this case, the determination processing employed when the vehicle is in the stopped state (separation determination and release completion determination processing employed when the vehicle is in the stopped state) is illustrated in FIG. 7, and the determination processing employed while the vehicle is running (separation determination and release completion determination processing employed while the vehicle is running) is illustrated in FIG. 8.

First, in the determination processing illustrated in FIG. 7, the determination of whether or not the brake pads 33 and the disc rotor 4 are separated from each other (separation determination) and the determination of whether or not the predetermined gap (clearance equal to or larger than the gap threshold value) is ensured between the brake pads 33 and the disc rotor 4 (release completion determination) are performed based on the current of the electric motor 43B, which is detected by the current sensor unit 24. In the determination processing illustrated in FIG. 7, when it is determined that the brake pads 33 and the disc rotor 4 have been separated from each other, the separation flag is turned on. When it is determined that the clearance equal to or larger than the gap threshold value is ensured between the brake pads 3 and the disc rotor 4, the release completion flag is turned on.

Specifically, when the processing operation illustrated in FIG. 7 is started based on the system activation (activation of the vehicle system or activation of the parking brake control device 19), for example, accessory ON, ignition ON, or power ON, the computation circuit 20 determines whether or not the drive of the electric motor 43B in the release direction has been started in Step 31. The processing of Step 31 and subsequent steps is performed when it is determined that the vehicle is in the stopped state based on, for example, a detection value from the velocity sensor (vehicle-velocity sensor or wheel-velocity sensors) mounted to the vehicle in the determination processing illustrated in FIG. 7.

When it is determined as "YES", specifically, the drive of the electric motor 43B in the release direction has been started in Step 31, the processing proceeds to Step 32. On the other hand, when it is determined as "NO", specifically, the drive of the electric motor 43B in the release direction has not been started, for example, the electric motor 43B is in a stopped state or is driven in the application direction in Step 31, the processing returns to before Step 31 to repeat the processing in Step 31, specifically, waits for the start of the drive of the electric motor 43B in the release direction. The reason for this is because the processing of Step 32 and subsequent steps, specifically, the contact determination and the release completion determination are to be started simultaneously with the start of the drive of the electric motor 43B in the release direction.

When the vehicle is in the stopped state, after the drive of the electric motor 43B in the application direction is started, that is, it is determined as "YES" in Step 31, determination of elapse of mask time (mask determination) is performed in Step 32. The determination of elapse of the mask time is performed so as to wait for convergence of the inrush current flowing immediately after the start of drive of the electric motor 43B, specifically, the first peak 25 in FIG. 9 to FIG. 13, for the separation determination and the release completion determination based on the current of the electric motor 43B. Specifically, the mask time is waiting time for the convergence of the first peak 25 corresponding to the change of the inrush current.

When it is determined as "NO", specifically, the mask time (waiting time) has not elapsed in Step 32, the processing returns to before Step 32 to repeat the processing in Step 32. On the other hand, when it is determined as "YES", specifically, the mask time has elapsed in Step 32, the processing proceeds to Step 33. In Step 33, idling determination (determination of whether or not there is a possibility of idling) at the time of release is performed. Specifically, when the change in current, which is caused by the inrush current flowing immediately after the start of execution of the release request, is defined as the first peak 25 and the change in current, which is caused after the first peak 25 and caused along with the transmission of the power of the electric motor 43B to the linearly movable member 42, specifically, start of movement of the linearly movable member 42, is defined as the second peak 26, in a case where the second peak 26 is not detected, there is a possibility that the power (rotation) of the electric motor 43B is not transmitted to the linearly movable member 42, specifically, the electric motor 43B is idling and a power transmission gear, a power transmission belt, or the like has an abnormality.

Therefore, in Step 33, it is determined whether or not a given time period has elapsed under a state in which the current value is equal to or smaller than a second peak threshold value 29 (see FIG. 9 to FIG. 13) after the elapse of the mask time. The second peak threshold value 29 serves not only as a determination value for the idling determination in Step 33 but also as a determination value for zero thrust-force pre-determination in Step 34 and a determination value for zero thrust-force determination in Step 35, which are described later. A value of the second peak threshold value 29 is obtained in advance through an experiment, a simulation, a calculation, or the like to be stored in the storage unit 21 so that the determinations described above can be appropriately performed. Further, the given time period is preset as a time period that enables necessary determination accuracy to be ensured so that the idling determination in Step 33 can be performed with high accuracy.

When it is determined as "NO", specifically, the current value is not continuously equal to or smaller than the second peak threshold value 29 for the given time period after the elapse of the mask time in Step 33, it is considered that the electric motor 43B is not idling (or there is a low possibility of idling). In this case, the processing proceeds to Step 34. In Step 34 and Step 35 subsequent thereto, it is determined whether or not the thrust force, specifically, the force for pressing the piston 39 with the linearly movable member 42, that is, the force of the brake pads 33 for pressing the disc rotor 4 has become zero. In Step 34, the zero thrust-force pre-determination is performed prior to the zero thrust-force determination in Step 35 described later. More specifically, in Step 34, it is determined whether or not a given time period has elapsed under a state in which the current value is equal to or larger than the second peak threshold value 29 and then a given time period has elapsed under a state in which the current value is equal to or smaller than the second peak threshold value 29. The given time periods are preset as time periods that enable necessary determination accuracy to be ensured so that the zero thrust-force pre-determination in Step 34 can be performed with high accuracy.

When it is determined as "NO", specifically, the given time period has not elapsed under the state in which the current value is equal to or larger than the second peak threshold value 29 and/or the given time period has not elapsed under the state in which the current value is equal to or smaller than the second peak threshold value 29 in Step 34, the processing returns to before Step 34 to repeat the processing in Step 34. On the other hand, when it is determined as "YES", specifically, the given time period has elapsed under the state in which the current value is equal to or larger than the second peak threshold value 29 and then the given time period has elapsed under the state in which the current value is equal to or smaller than the second peak threshold value 29 in Step 34, the processing proceeds to Step 35.

In Step 35, the zero thrust-force determination for determining whether or not the thrust force has become zero is performed. More specifically, in Step 35, it is determined whether or not a current derivative value being a temporal change amount of the current has become equal to or smaller than a preset zero thrust-force threshold value. Specifically, when the thrust force becomes zero, the current converges to a constant value. Along with the convergence, the current derivative value is decreased. Therefore, in Step 35, when the current derivative value becomes equal to or smaller than the preset zero thrust-force threshold value, it is determined that the thrust force has become zero. In this case, a value of the zero thrust-force threshold value is obtained in advance through an experiment, a simulation, a calculation, or the like to be stored in the storage unit 21 so that whether or not the thrust force has become zero can be appropriately determined.

When it is determined as "NO", specifically, the current derivative value has not become equal to or smaller than the zero thrust-force threshold value in Step 35, the processing returns to before Step 35 to repeat the processing in Step 35. On the other hand, when it is determined as "YES", specifically, the current derivative value has become equal to or smaller than the zero thrust-force threshold value in Step 35, it is considered that the thrust force has become zero to separate the brake pads 33 and the disc rotor 4 from each other. In this case, the processing proceeds to Step 36 to turn on the separation flag. As described above, in the separation determination in the stopped state illustrated in FIG. 7, in a case where it is detected that the present current has been decreased to the predetermined current value, specifically, has become equal to or smaller than the second peak threshold value 29 after the convergence of the inrush current, specifically, the first peak 25 and the present temporal change amount in current has become equal to or smaller than the predetermined change amount, specifically, has become equal to or smaller than the zero thrust-force threshold value after the detection, through the processing in Step 32, Step 34, and Step 35, it is determined (detected) that the brake pads 33 and the disc rotor 4 have been separated from each other, specifically, the thrust force has become zero to turn on the separation flag.

In Step 37 subsequent to Step 36, it is determined whether or not the brake pads 33 and the disc rotor 4 now have a predetermined clearance, specifically, a clearance (X1+X2) expressed as a sum of X1 and X2 illustrated in FIG. 3 has become equal to or larger than a preset gap threshold value. In this case, the clearance can be obtained as, for example, a displacement amount after the determination of zero thrust force (the separation between the brake pads 33 and the disc rotor 4), specifically, a displacement amount after the turning on of the separation flag, based on a relationship between the current value, a voltage value, and a rotation amount of the electric motor 43B, and a relationship between the rotation amount and a displacement amount (retract amount) of the brake pads 33 (piston 39 or linearly movable member 42). The gap threshold value is obtained in advance through an experiment, a simulation, a calculation, or the like to be stored in the storage unit 21 so that the release can be completed with an appropriate clearance.

When it is determined as "NO", specifically, the predetermined clearance has not been achieved, that is, the clearance is smaller than the gap threshold value in Step 37, the processing returns to before Step 37 to repeat the processing in Step 37. Meanwhile, when it is determined as "YES", specifically, the clearance has become equal to or larger than the gap threshold value in Step 37, the processing proceeds to Step 38 to turn on the release completion flag. In the release control processing illustrated in FIG. 6, the drive of the electric motor 43B, which has been started in the release direction, is stopped on condition that the separation flag is turned on, the release completion flag is turned on, and the application allowance flag described later is turned on.

On the other hand, when it is determined as "YES", specifically, the current value has continued to be equal to or smaller than the second peak threshold value 29 for the given time period after the elapse of the mask time in Step 33, the processing proceeds to Step 39. In this case, the separation between the brake pads 33 and the disc rotor 4 is detected without detecting the second peak 26. More specifically, the given time period has elapsed under the state in which the current value is equal to or smaller than the second peak threshold value 29, which is one of the conditions for the determination of separation. In this case, it is considered that there is a possibility that the power (rotation) of the electric motor 43B is not transmitted to the linearly movable member 42, specifically, a possibility of an idling abnormality of the electric motor 43B. More specifically, it is considered that the idling abnormality of the electric motor 43B has occurred, the brake pedal 6 is being depressed (for example, the hydraulic pressure in the cylinder portion 36 of the caliper 34 is high, or thus the hydraulic pressure is applied to the piston 39), or the thrust force based on the drive of the electric motor 43B when the application is performed is small.

Therefore, in Step 39, in order to determine whether or not the electric motor 43B is idling, the electric motor 43B is driven in the application direction, specifically, the power is fed in the application direction so as to execute the application regardless of the release request generated in the request generating unit, specifically, although the release request is generated in the request generating unit. In subsequent Step 40, idling determination during application is performed. Specifically, it is determined whether or not a given time period has elapsed from the start of drive of the electric motor 43B in the application direction. The given time period is preset as a time period that enables necessary determination accuracy to be ensured so that the determination for the idling abnormality of the electric motor 43B can be performed with high accuracy.

When it is determined as "NO", specifically, the given time period has not elapsed in Step 40, the processing proceeds to Step 41. In Step 41, a thrust-force rise determination is performed. Specifically, in Step 41, it is determined whether or not a given time period has elapsed under a state in which the current value is equal to or larger than a rise threshold value. Specifically, without the idling abnormality of the electric motor 43B, when the electric motor 43B is driven in the application direction, the thrust force being the force for pressing the piston 39 with the linearly movable member 42, specifically, the force of the brake pads 33 for pressing the disc rotor 4 is generated. Thus, an increase (rise) of the current value in accordance with the thrust force can be detected. Therefore, in Step 41, when the current value has the increase (rise), it is determined that the idling abnormality has not occurred, specifically, the brake pedal 6 is depressed or the thrust force at the time of application is small.

When it is determined as "YES", specifically, the given time period has elapsed under the state in which the current value is equal to or larger than the rise threshold value in Step 41, the idling abnormality has not occurred. Thus, the processing proceeds to Step 42 to drive the electric motor 43B in the release direction, specifically, the power is fed in the release direction. Then, the processing proceeds to Step 35. On the other hand, when it is determined as "NO", specifically, the current value is smaller than the rise threshold value or the current value is equal to or larger than the rise threshold value but the given time period has not elapsed in Step 41, the processing returns to before Step 40 to repeat the processing of Step 40 and subsequent steps. When it is determined as "YES", specifically, the given time period has elapsed without the rise of the current value in Step 40, the processing proceeds to Step 43 to determine the occurrence of the idling abnormality. In this case, the drive of the electric motor 43B is stopped, while the separation determination and release completion determination processing is terminated to perform processing to cope with the abnormality, for example, notify the driver of the occurrence of the idling abnormality, specifically, the abnormality of the electric parking brake.

Next, the separation determination and release completion determination processing illustrated in FIG. 8, which is used while the vehicle is running, is described. In the determination processing illustrated in FIG. 8, determination (separation determination) of whether or not the brake pads 33 and the disc rotor 4 are separated, determination of whether or not to allow the application during running of the vehicle, that is, determination (application allowance determination) of whether or not a (first) predetermined gap (clearance equal to or larger than the minimum return amount) is ensured between the brake pads 33 and the disc rotor 4, and determination (release completion determination) of whether or not a (second) predetermined gap (clearance equal to or larger than the gap threshold value) is ensured between the brake pads 33 and the disc rotor 4 are performed based on the current of the electric motor 43B, which is detected by the current sensor unit 24. In the determination processing illustrated in FIG. 8, when the separation between the brake pads 33 and the disc rotor 4 is determined, the separation flag is turned on. When it is determined that the clearance equal to or larger than the minimum return amount is ensured between the brake pads 33 and the disc rotor 4, the application allowance flag is turned on. When it is determined that the clearance equal to or larger than the gap threshold value is ensured between the brake pads 33 and the disc rotor 4, the release completion flag is turned on.

Specifically, when the processing operation illustrated in FIG. 8 is started based on the system activation (activation of the vehicle system or activation of the parking brake control device 19), for example, accessory ON, ignition ON, or power ON, the computation circuit 20 determines whether or not the drive of the electric motor 43B in the release direction has been started in Step 51. The processing of Step 51 and subsequent steps is performed when it is determined that the vehicle is in the running state based on, for example, a detection value from the velocity sensor (vehicle-velocity sensor or wheel-velocity sensors) mounted to the vehicle in the determination processing illustrated in FIG. 8.

Processing in Step 51 to Step 56 of FIG. 8 is similar to the processing in Step 31 to Step 36 of FIG. 7. Specifically, even in separation determination during running illustrated in FIG. 8, in a case where it is detected that the present current has been decreased to the predetermined current value, specifically, has become equal to or smaller than the second peak threshold value 29 after the convergence of the inrush current (first peak 25) and the present temporal change amount in current has become equal to or smaller than the predetermined change amount, specifically, has become equal to or smaller than the zero thrust-force threshold value after the detection, through the processing in Step 52, Step 54, and Step 55, it is determined (detected) that the brake pads 33 and the disc rotor 4 have been separated from each other, specifically, the thrust force has become zero to turn on the separation flag.

On the other hand, when it is determined as "YES", specifically, the current value is continuously equal to or smaller than the second peak threshold value 29 for the given time period after the elapse of the mask time in Step 53, the processing proceeds to Step 61. In the above-mentioned separation determination and release completion determination processing used when the vehicle is in the stopped state illustrated in FIG. 7, when it is determined as "YES" in Step 33, the electric motor 43B is driven in the application direction in Step 39 so as to determine the idling abnormality of the electric motor 43B. On the other hand, in the separation determination and release completion determination processing used while the vehicle is running illustrated in FIG. 8, the electric motor 43B is not driven in the application direction. Specifically, in Step 61, zero thrust-force estimation time elapse determination processing is performed. More specifically, it is determined whether or not a given time period has elapsed after the start of release.

Specifically, when the separation between the brake pads 33 and the disc rotor 4 is detected, specifically, the given time period has elapsed under the state in which the current value is equal to or smaller than the second peak threshold value 29 without detecting the second peak 26, it is considered that the idling abnormality has occurred, the brake pedal 6 is depressed, specifically, the hydraulic pressure is applied to the piston 39, or the thrust force generated based on the drive of the electric motor 43B at the time of application is small. In this case, a probability of the idling abnormality is lower than a probability of the other cases.

Therefore, in the separation determination processing during running illustrated in FIG. 8, in consideration of a high possibility of use of the parking brake as the auxiliary brake in emergency during running, the elapse of the given time period from the start of the release is waited for without driving the electric motor 43B in the application direction for the determination of the idling abnormality. Specifically, in Step 61, when the brake pedal 6 is depressed, specifically, the hydraulic pressure is applied to the piston 39 or when the thrust force generated based on the drive of the electric motor 43B at the time of application is small, it is determined whether or not the given time period within which the thrust force is considered to become zero has elapsed from the start of release. A value of the given time period is obtained in advance through an experiment, a simulation, a calculation, or the like to be stored in the storage unit 21 as a time period within which the thrust force becomes zero from the start of release.

When it is determined as "NO", specifically, the given time period has not elapsed from the start of release in Step 61, the processing returns to before Step 61 to repeat the processing in Step 61. On the other hand, when it is determined as "YES", specifically, the given time period has elapsed from the start of release in Step 61, the processing proceeds to Step 56 to turn on the separation flag. As described above, in the separation determination used during running illustrated in FIG. 8, when it is determined as "YES" in Step 53 based on the application of the hydraulic pressure to the piston 39 or the like, the separation between the brake pads 33 and the disc rotor 4 is detected based on the elapsed time from the start of drive of the electric motor 43B.

In Step 57 subsequent to Step 56, minimum return amount determination is performed. More specifically, whether or not the clearance (X1+X2) between the brake pads 33 and the disc rotor 4 has become equal to or larger than the preset minimum return amount is determined. The minimum return amount can be set as, for example, a minimum return amount that is necessary when dynamic parking braking (dynamic application) is performed, for example, the parking brake is used as the auxiliary brake in emergency during running. When it is determined as "NO", specifically, the clearance has not become equal to or larger than the preset minimum return amount in Step 57, the processing returns to before Step 57 to repeat the processing in Step 57.

On the other hand, when it is determined as "YES", specifically, the clearance has become equal to or larger than the preset minimum return amount in Step 57, the processing proceeds to Step 58 to turn on the application allowance flag. As a result, for example, when the ABS control or the like is performed during the dynamic application, specifically, the application request is given during the release operation while the vehicle is running, the release operation, specifically, the drive of the electric motor 43B in the release direction is continued at least until the application allowance flag is turned on. Therefore, even when the release request and the application request are repeated at short intervals under the ABS control, the clearance equal to or larger than the minimum return amount can be ensured between the brake pads 33 and the disc rotor 4, thereby suppressing locking (slip) of the wheels (rear wheels 3). The processing in Step 59 and the processing in Step 60 are similar to those in Step 37 and Step 38 of FIG. 7.

Next, time charts when the processing illustrated in FIG. 4 to FIG. 8 is performed by the parking brake control device 19 are described referring to FIG. 9 to FIG. 13.

Figure 9:
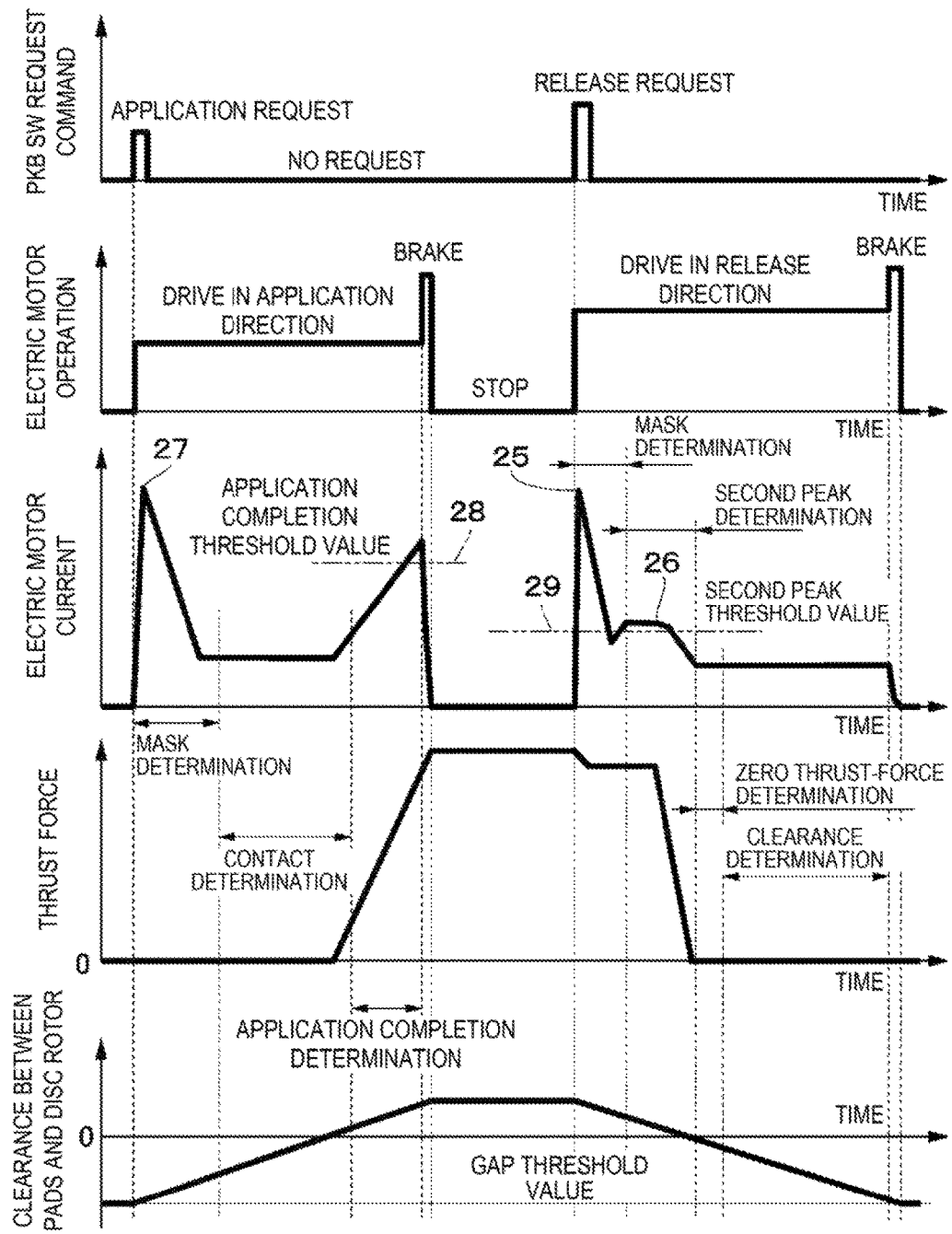
FIG. 9 is a characteristic line graph for showing an example of a temporal change in a state of each component when a release request is given after completion of an application operation.

FIG. 9 is a time chart for illustrating a case where normal application and release are performed, specifically, the release request is received after the completion of the application operation. In this case, when the application request is given based on the operation of the parking brake switch (PKB SW) 18, the processing proceeds from Step 1 to Step 2, Step 3, Step 4, and Step 5 of FIG. 4. In parallel to this processing, the processing in Step 11 to Step 18 of FIG. 5 is performed. Specifically, after the start of drive of the electric motor 43B in the application direction is determined in Step 11, the mask determination in Step 12, the contact determination in Step 13, Step 14, and Step 15, and the application completion determination in Step 17 are performed. Then, after the application completion flag is turned on in Step 18 of FIG. 5, it is determined as "YES" in Step 5 of FIG. 4 and the drive of the electric motor 43B in the application direction is stopped, specifically, the application operation is completed in Step 7.

Thereafter, when the release request is given based on the operation of the parking brake switch 18, the processing proceeds from Step 21 to Step 22, Step 23, Step 24, and Step 25 of FIG. 6. In parallel to this processing, the processing illustrated in FIG. 7 or the processing illustrated in FIG. 8 is performed. For example, when the vehicle is in the stopped state, the mask determination in Step 32 of FIG. 7, the second peak determination in Step 33 and Step 34, and the zero thrust-force determination, specifically, the determination of separation between the brake pads 33 and the disc rotor 4 in Step 35, and the clearance determination in Step 37 are performed. Then, after the release completion flag is turned on in Step 38 of FIG. 7, it is determined as "YES" in Step 25 of FIG. 6 to stop the drive of the electric motor 43B in the release direction, specifically, the release operation is completed in Step 29.

Figure 10:
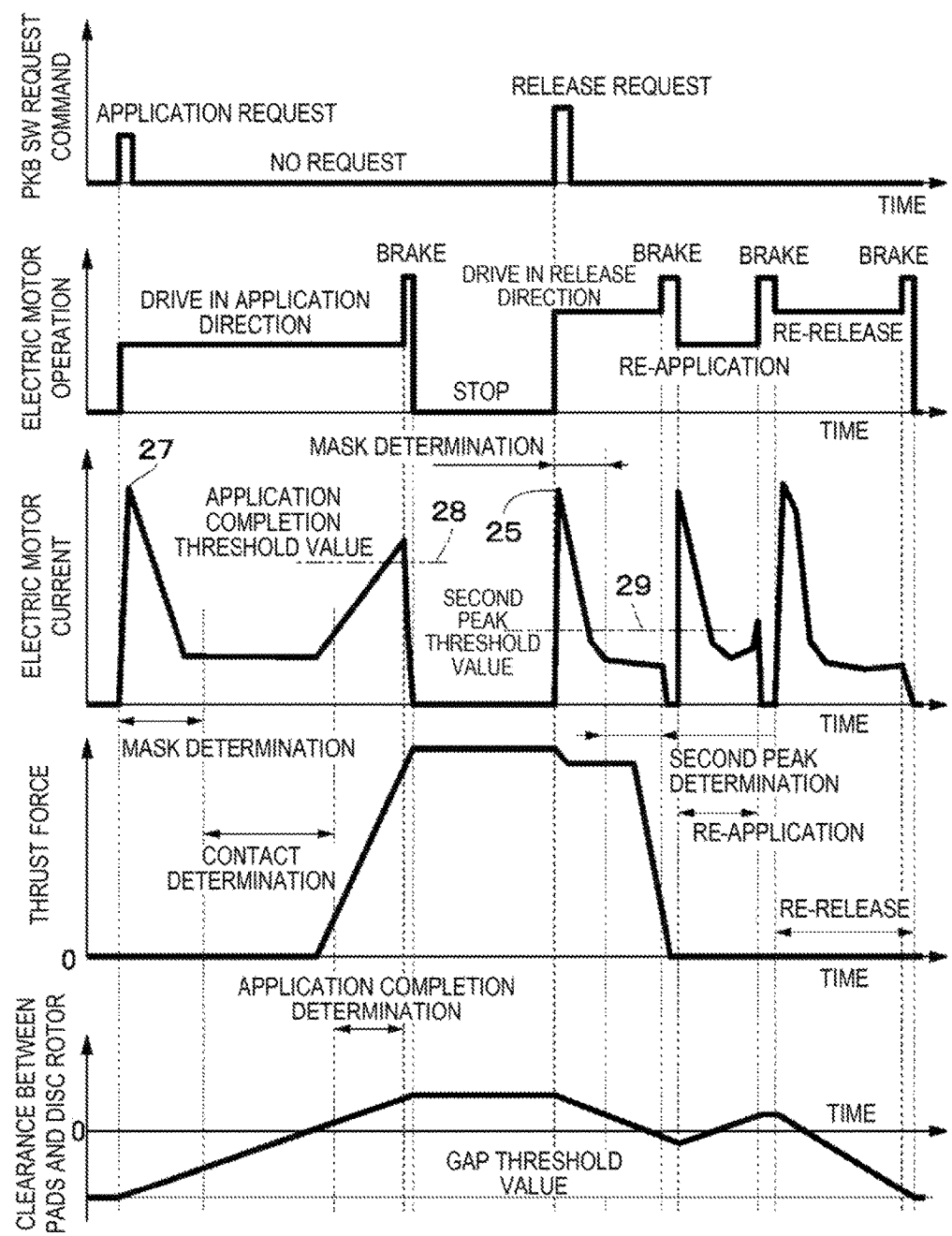
FIG. 10 is a characteristic line graph for showing an example of a temporal change in the state of each component when a hydraulic pressure is high during a release operation.

Similarly to FIG. 9, FIG. 10 is also a time chart for illustrating the case where the release request is received after the completion of the application operation. However, FIG. 10 differs from FIG. 9 in that the hydraulic pressure is high during the release operation. Specifically, the hydraulic pressure is high at the time of release in FIG. 10, and hence it is determined as "YES" in Step 33 of FIG. 7 to perform the processing in Step 39 to Step 42. Therefore, during the release, the drive of the electric motor 43B in the application direction (re-application) is performed. The "second peak determination" illustrated in FIG. 10 corresponds to the processing in Step 33 of FIG. 7, the "re-application" illustrated in FIG. 10 corresponds to the processing in Step 39, Step 40, and Step 41 of FIG. 7, and "re-release" illustrated in FIG. 10 corresponds to the processing in Step 42, Step 35, Step 36, Step 37, and Step 38 of FIG. 7.

Figure 11:
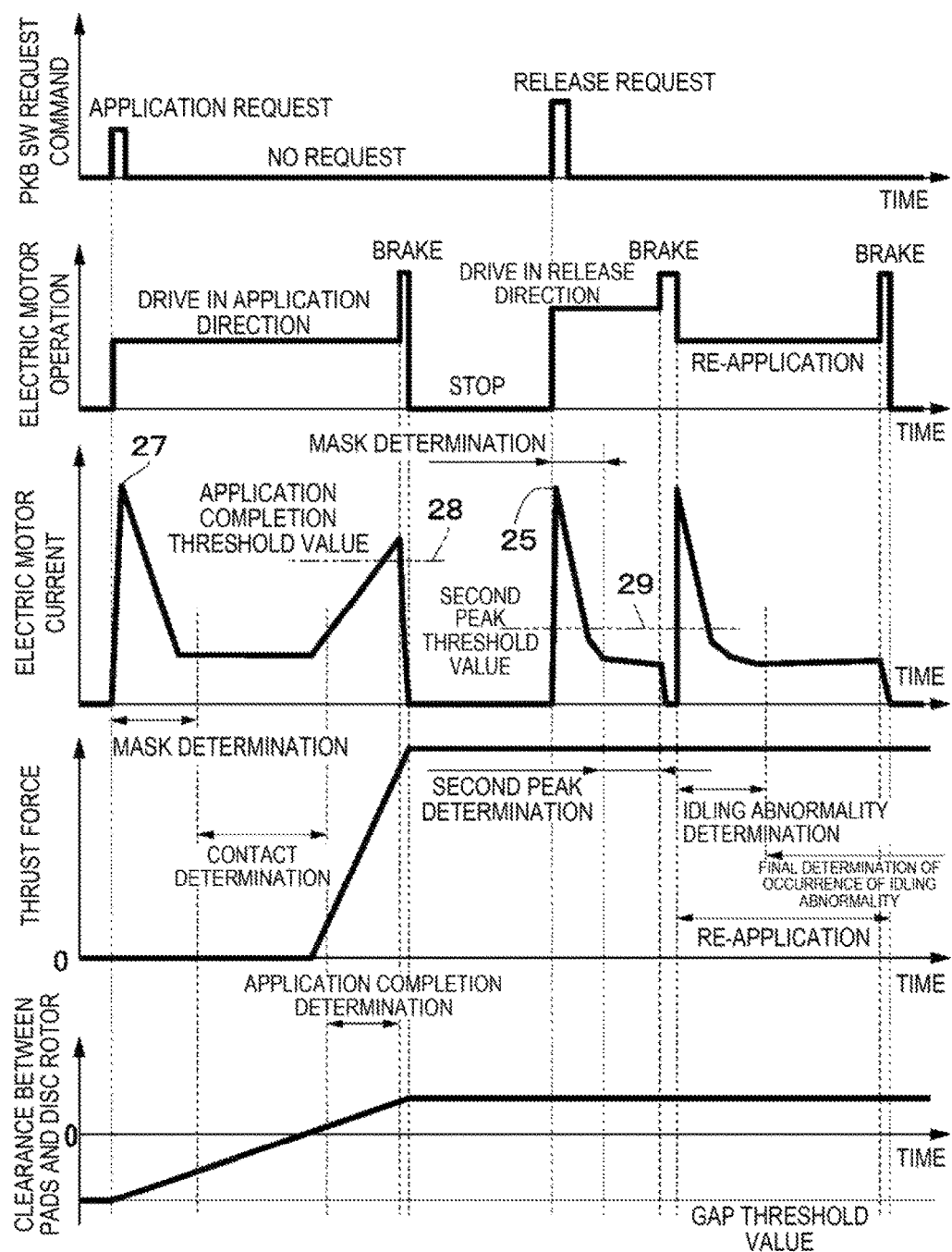
FIG. 11 is a characteristic line graph for showing an example of a temporal change in the state of each component when an idling abnormality occurs during the release operation.

Similarly to FIG. 9, FIG. 11 is also a time chart for illustrating the case where the release request is received after the completion of the application operation. However, FIG. 11 differs from FIG. 9 in that the idling abnormality occurs during the release operation. Specifically, the idling abnormality occurs at the time of release in FIG. 11. Thus, it is determined as "YES" in Step 33 of FIG. 7, it is determined as "YES" in Step 40, and the occurrence of the idling abnormality is finally determined in Step 43. In this case, the power (rotation) of the electric motor 43B is not transmitted to the linearly movable member 42 at the time of release, and therefore the thrust force and the clearance remain unchanged from values at the completion of application. The "second peak determination" illustrated in FIG. 11 corresponds to the processing in Step 33 of FIG. 7, the "re-application" and "idling abnormality determination" illustrated in FIG. 11 correspond to the processing in Step 39 and Step 40 of FIG. 7, and "idling abnormality occurrence final determination" illustrated in FIG. 11 corresponds to the processing in Step 43.

Figure 12:
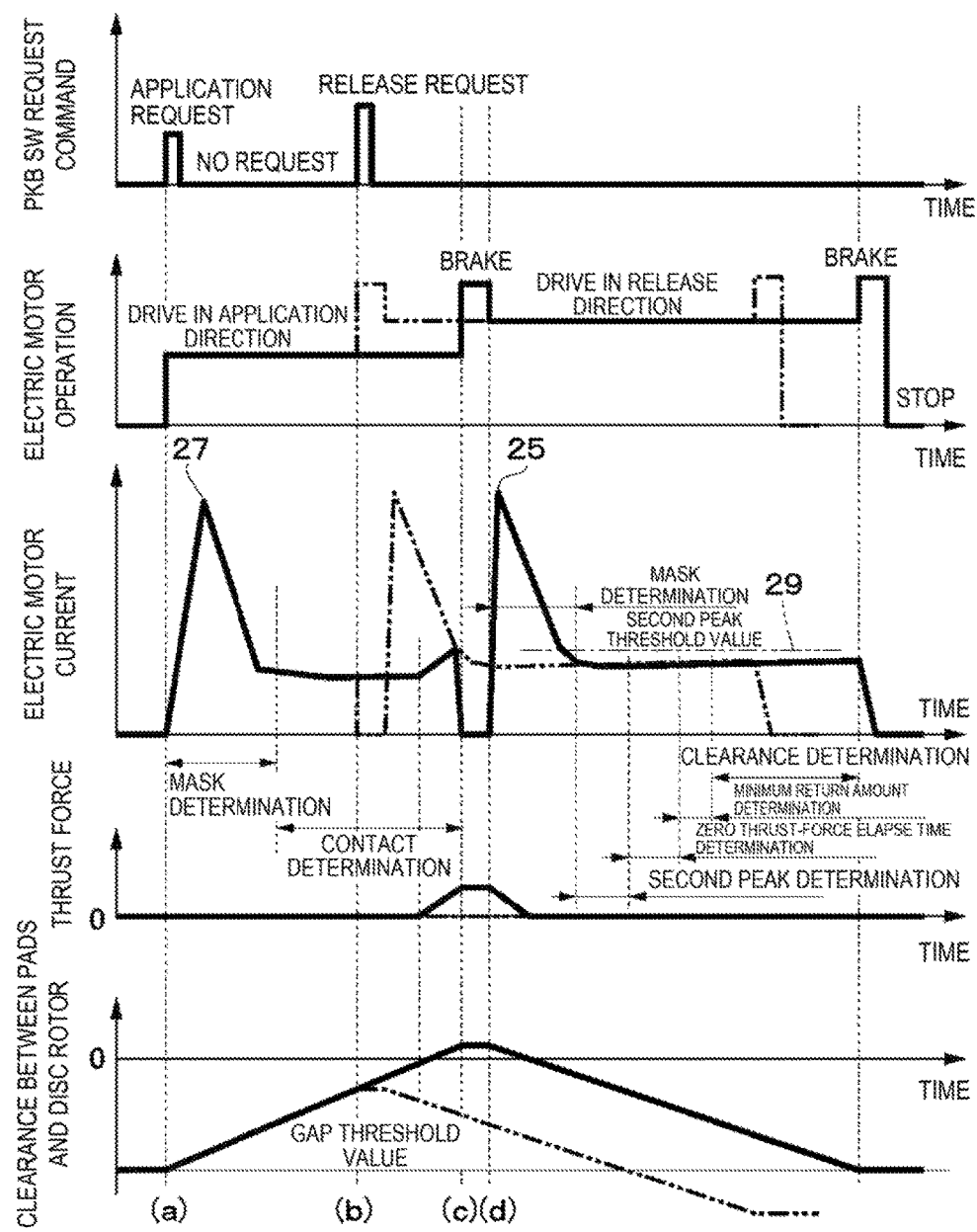
FIG. 12 is a characteristic line graph for showing an example of a temporal change in the state of each component when the release request is given during execution of an application request.

FIG. 12 is a time chart for illustrating a case where the release request is received within a time period from the start of the execution of the application request to the contact between the brake pads 33 and the disc rotor 4. In this case, when the application request based on the operation of the parking brake switch 18 is given at a time (a) on a time axis of FIG. 12, the drive of the electric motor 43B in the application direction is started. Even when the release request based on the operation of the parking brake switch 18 is given at a time (b) on the time axis of FIG. 12, the brake pads 33 and the disc rotor 4 are not in contact with each other, and hence the release request is not immediately executed. Specifically, the drive of the electric motor 43B in the application direction is continued through the processing in Step 6 of FIG. 4 until the contact flag is turned on.

When the contact between the brake pads 33 and the disc rotor 4 is detected at a time (c) on the time axis of FIG. 12 based on the change (rise) in current of the electric motor 43B, specifically, the contact determination in Step 13, Step 14, and Step 15 of FIG. 5, the contact flag is turned on to stop the drive of the electric motor 43B in the application direction. Then, at a time (d) on the time axis of FIG. 12, the drive of the electric motor 43B in the release direction is started. FIG. 12 is a time chart for illustrating a case where the vehicle is running. Specifically, in the release illustrated in FIG. 12, through the second peak determination in Step 53 of FIG. 8, the zero thrust-force elapse time determination in Step 61, the minimum return amount determination in Step 57, and the clearance determination in Step 59, the release completion flag is turned on in Step 60 to stop the drive of the electric motor 43B in the release direction, specifically, to complete the release operation. In FIG. 12, a change in state when the release request is immediately executed is represented by a characteristic line in thick long dashed double-short dashed line. In this case, there is a fear in that the clearance at the completion of release may become surplus. In contrast, in this embodiment, the clearance at the completion of release can be appropriately maintained, as represented by a characteristic line in thick solid line.

Figure 13:
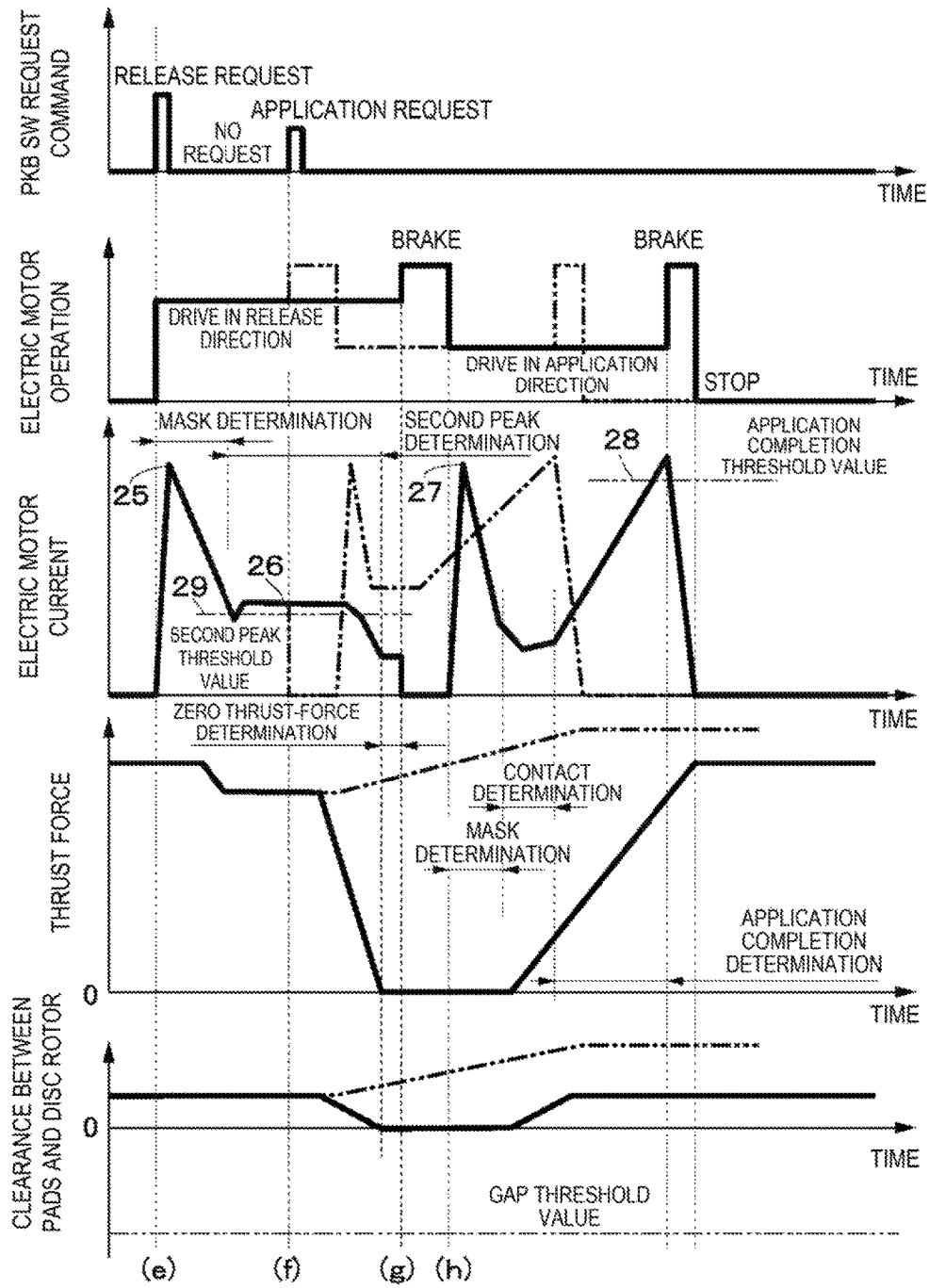
FIG. 13 is a characteristic line graph for showing an example of a temporal change in the state of each component when the application request is given during execution of the release request.

Meanwhile, FIG. 13 is a time chart for illustrating a case where the application request is received within a time period from the start of the execution of the release request to the separation between the brake pads 33 and the disc rotor 4. In this case, when the release request based on the operation of the parking brake switch 18 is given at a time (e) on a time axis of FIG. 13, the drive of the electric motor 43B in the release direction is started. Even when the application request based on the operation of the parking brake switch 18 is given at a time (f) on the time axis of FIG. 13, the brake pads 33 and the disc rotor 4 are not separated from each other, and hence the application request is not immediately executed. Specifically, the drive of the electric motor 43B in the release direction is continued through the processing in Step 27 of FIG. 6 until the separation flag is turned on. While the vehicle is running, the drive of the electric motor 43B in the release direction is continued through the processing in Step 28 of FIG. 6 until the application allowance flag is turned on.

When the separation between the brake pads 33 and the disc rotor 4 is detected based on the change in current of the electric motor 43B (decrease in current value or decrease in temporal change amount), specifically, the second peak determination in Step 33 and Step 34 of FIG. 7 and the zero thrust-force determination (separation determination) in Step 35 at a time (g) on the time axis of FIG. 13, the separation flag is turned on to stop the drive of the electric motor 43B in the release direction. Then, at a time (h) on the time axis of FIG. 13, the drive of the electric motor 43B in the application direction is started. In FIG. 13, a change in state when the application request is immediately executed is represented by a characteristic line in thick long dashed double-short dashed line. In this case, there is a fear in that the thrust force at the completion of application may become excessive. In contrast, in this embodiment, the thrust force at the completion of application can be appropriately maintained, as represented by a characteristic line in thick solid line.

In the first embodiment, the brake pads 33 and the disc rotor 4 can be maintained in a desired positional relationship.

Specifically, when the parking brake control device 19 receives the release request after the start of execution of the application request, the contact flag is turned on through the processing in Step 6 of FIG. 4. Then, the drive of the electric motor 43B in the application direction is stopped through the processing in Step 7. After the stop of the drive, the release request is executed through the processing in Step 22 and Step 23 of FIG. 6. Further, when the parking brake control device 19 receives the application request after the start of execution of the release request, the separation flag is turned on through the processing in Step 27 of FIG. 6. Then, the drive of the electric motor 43B in the release direction is stopped through the processing in Step 29. After the stop of the drive, the application request is executed through the processing in Step 2 and Step 3 of FIG. 4. In other words, even when the second request (release request or application request) that is a request opposite to the first request (application request or release request) is given during the execution of the first request, the parking brake control device 19 continues the execution of the first request until the control flag is turned on or the separation flag is turned on without starting the execution of the second request. Therefore, the parking brake control device 19 can maintain the positional relationship between the brake pads 33 and the disc rotor 4, specifically, the position of the linearly movable member 42 in a desired positional relationship or position, based on the contact or the separation between the brake pads 33 and the disc rotor 4, which is indicated by the contact flag or the separation flag, as a reference.

More specifically, the degree of load of the electric motor 43B corresponding to the thrust force of the piston 39 or the brake pads 33 can be detected based on the change in current of the electric motor 43B, for example, the current value or the temporal change amount (derivative value) thereof. Therefore, the positional relationship between the brake pads 33 and the disc rotor 4, specifically, the contact or the separation between the brake pads 33 and the disc rotor 4 can be detected based on the current value of the electric motor 43B or the temporal change amount (derivative value) thereof. The parking brake control device 19 terminates the execution of the first request, which is currently being executed, and starts the execution of the second request, which is a subsequent request, on condition that the change in current of the electric motor 43B, which corresponds to the contact or the separation between the brake pads 33 and the disc rotor 4, is detected. Thus, the positional relationship between the brake pads 33 and the disc rotor 4 can be regulated (controlled) with high accuracy based on the contact or the separation as the reference even without providing the position sensor configured to detect the position of the brake pad 33, the thrust-force sensor configured to detect the thrust force thereof, or the like.

In the first embodiment, through the processing in Step 12 to Step 18 of FIG. 5, the difference between the average value of the no-load current flowing after the convergence of the inrush current 27 flowing immediately after the start of the execution of the application request and the present current is calculated. Then, when the difference becomes equal to or larger than the predetermined value, the parking brake control device 19 detects the contact between the brake pads 33 and the disc rotor 4. In this case, as compared to the configuration in which, for example, the contact between the brake pads 33 and the disc rotor 4 is detected based on the derivative value of the current, the detection can be less affected by a temporal change (noise) in current. In this manner, the accuracy of detection of the contact between the brake pads 33 and the disc rotor 4 can be improved.

In the first embodiment, through the processing in Step 32, Step 34, Step 35, and Step 36 of FIG. 7 or the processing in Step 52, Step 54, Step 55, and Step 56 of FIG. 8, the parking brake control device 19 detects that the present current is decreased to the predetermined current value after the convergence of the first peak 25 being the inrush current flowing immediately after the start of execution of the release request. Then, when the present temporal change amount in current becomes equal to or smaller than the predetermined change amount after the detection, the separation between the brake pads 33 and the disc rotor 4 is detected. Therefore, by using the two conditions corresponding to the current value and the temporal change amount in current, the separation between the brake pads 33 and the disc rotor 4 can be detected with high accuracy.

In the first embodiment, when detecting the separation between the brake pads 33 and the disc rotor 4 without detecting a change in current at the second peak 26 subsequent to the first peak 25, specifically, detecting that the current value is equal to or smaller than the second peak threshold value 29 for the given time period after the convergence of the change in current at the first peak 25 through the processing in Step 33 of FIG. 7, the parking brake control device 19 executes the application through the processing in Step 39 of FIG. 7 although the release request is being executed. In this case, the abnormality regarding whether or not the power (rotation) of the electric motor 43B is transmitted, specifically, whether or not the idling is occurring can be determined based on the change in current after the execution of the application. In this manner, reliability of the hydraulic disc brake 31 having the electric parking brake function can be improved.

In the first embodiment, the application request and the release request include not only the requests generated by the operation performed by the driver but also the requests generated based on the ABS control. Therefore, the locking (slip) of the wheels (rear wheels 3) can be suppressed. Specifically, even when the application request is given during the execution of the release request based on the ABS control, the execution of the release request is continued until the brake pads 33 and the disc rotor 4 are separated from each other and the clearance becomes equal to the minimum return amount. In this manner, the brake pads 33 and the disc rotor 4 can be reliably separated from each other. As a result, the braking force is released by the separation to enable the suppression of locking of the wheels (rear wheels 3).

In the first embodiment, the contact or the separation between the brake pads 33 and the disc rotor 4 is detected in consideration of the displacement of the piston 39 based on the hydraulic pressure. Specifically, when the hydraulic pressure is applied to the piston 39, the contact between the brake pads 33 and the disc rotor 4 is detected based on the change in current, which is caused by the contact of the linearly movable member 42 with the piston 39 through the processing in Step 17 of FIG. 5. Further, for example, when the hydraulic pressure is applied to the piston 39 while the vehicle is running, the separation between the brake pads 33 and the disc rotor 4 is detected based on the elapsed time from the start of drive of the electric motor 43B in the release direction through the processing in Step 61 of FIG. 8. Therefore, even when the piston 39 is displaced based on the supply of the hydraulic pressure, which is caused by the depression of the brake pedal 6 or the like, the contact or the separation between the brake pads 33 and the disc rotor 4 can be appropriately detected.

Figure 14:
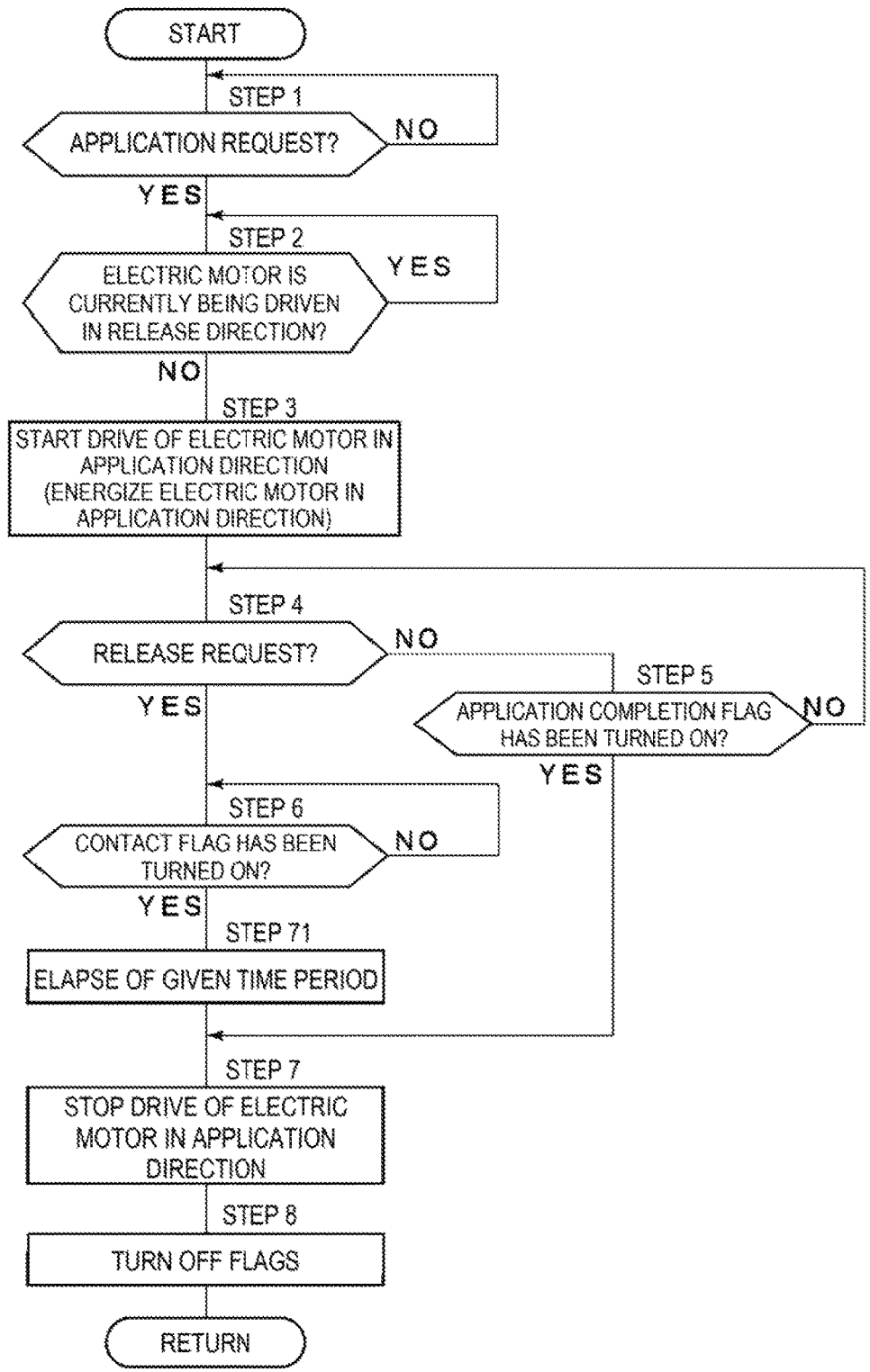
FIG. 14 is a flowchart for illustrating control processing for application according to a second embodiment of the present invention.
Figure 15:
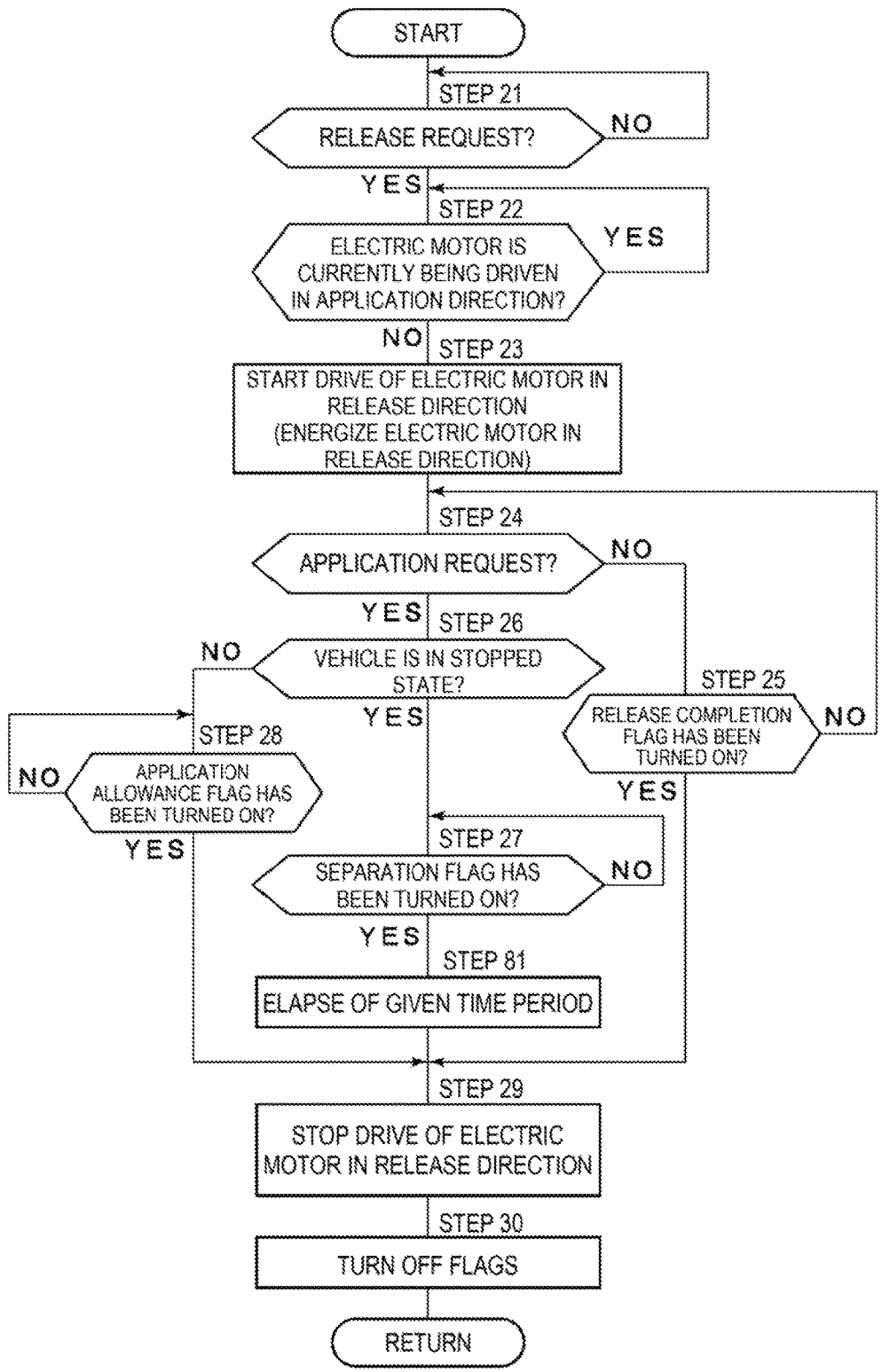
FIG. 15 is a flowchart for illustrating control processing for release according to the second embodiment.

Next, FIG. 14 and FIG. 15 are flowcharts for illustrating a second embodiment of the present invention. A feature of the second embodiment lies in a configuration in which the second request is executed after elapse of a given time period from the detection of the contact or the separation between the pads and the rotor after the start of execution of the first request. Specifically, the release request is executed after the elapse of the given time period from the detection of the contact between the pads and the rotor after the start of execution of the application request. Further, the application request is executed after the elapse of the given time period from the detection of the separation between the pads and the rotor after the start of execution of the release request. The same components as those of the first embodiment described above are denoted by the same reference symbols in the second embodiment, and the description thereof is herein omitted.

FIG. 14 is a chart for illustrating application control processing of the second embodiment. The application control processing of the second embodiment includes processing in Step 71, specifically, processing for waiting for the elapse of the given time period after turning on of the contact flag, subsequent to Step 6. Along with the addition of the processing of Step 71, after it is determined as "YES", that is, the contact flag is turned on in Step 6, the processing proceeds to Step 7 after elapse of the given time period in Step 71. Then, the drive of the electric motor 43B in the application direction is stopped. As a result, as compared to the first embodiment, time during which the electric motor 43B is driven in the application direction, after the achievement of contact between the brake pads 33 and the disc rotor 4 can be increased.

The given time period is provided so as to make the change in current of the electric motor 43B noticeable at the time of the release request executed after the contact flag is turned on. Specifically, in the application control processing of the second embodiment, the drive of the electric motor 43B in the application direction is continued for the given time period after the contact between the brake pads 33 and the disc rotor 4, thereby increasing the thrust force generated based on the drive of the electric motor 43B. In this manner, the load of the electric motor 43B at the start of release can be increased. As a result, the change in current at the time of separation between the brake pads 33 and the disc rotor 4, which is caused by the release, can be made noticeable, and, for example, appearance of the second peak 26 can be made noticeable. As a result, the improvement of accuracy of the determination of separation after the start of release can be achieved.

Meanwhile, FIG. 15 is a chart for illustrating release control processing of the second embodiment. The release control processing of the second embodiment includes processing in Step 81, specifically, processing for waiting for the elapse of the given time period after turning on of the separation flag, subsequent to Step 27. Along with the addition of the processing of Step 81, after it is determined as "YES", that is, the separation flag is turned on in Step 27, the processing proceeds to Step 29 after elapse of the given time period in Step 81. Then, the drive of the electric motor 43B in the release direction is stopped. As a result, as compared to the first embodiment, time during which the electric motor 43B is driven in the release direction, after the achievement of separation between the brake pads 33 and the disc rotor 4 can be increased.

The given time period is provided so that a necessary calculation of the current value can be performed at the time of the application request executed after the separation flag is turned on. Specifically, the given time period can be set as a time period corresponding to a time period that is necessary to calculate the average value of the no-load current flowing after the convergence of the inrush current 27 flowing immediately after the start of execution of the application request. In this case, the given time period can be set as a time period corresponding to a predetermined number of revolutions (rotation amount) of the electric motor. In this manner, the improvement of accuracy of the determination of contact after the start of application can be achieved.

In the second embodiment, the elapse of the given time period is waited for in Step 71 or Step 81 described above after the detection of the contact or the separation. Basic functions thereof are not particularly different from those of the first embodiment described above.

In particular, in the second embodiment, after the elapse of the given time period from the detection of the contact between the brake pads 33 and the disc rotor 4 through the processing in Step 71 of FIG. 14 after the start of execution of the application request, the release request is executed. In this manner, the load of the electric motor 43B at the start of release can be increased. Thus, the improvement of accuracy of the determination of separation after the start of release can be achieved.

In the second embodiment, after the elapse of the given time period from the detection of the separation between the brake pads 33 and the disc rotor 4 through the processing in Step 81 of FIG. 15 after the start of execution of the release request, the application request is executed. In this case, a separation distance between the brake pads 33 and the disc rotor 4 can be increased as a result of the elapse of the given time period. Therefore, after the start of the execution of the application request, the change in current (change in the inrush current 27) in early time of the drive of the electric motor 43B can be detected before the brake pads 33 and the disc rotor 4 are brought into contact with each other. Specifically, the change in current after the start of execution of the application request can be classified into a change generated in the early time of the drive of the electric motor 43B and a change caused due to the contact between the brake pads 33 and the disc rotor 4, that is, the change in current can be clearly defined. As a result, the accuracy of detection of the contact between the brake pads 33 and the disc rotor 4 after the start of execution of the application request can be improved.

In the second embodiment, the given time period is set as a time period corresponding to a time period necessary to calculate the average value of the no-load current flowing after the convergence of the inrush current 27 flowing immediately after the start of execution of the application request. In this case, besides the detection of the inrush current 27, the subsequent calculation of the average value of the no-load current can be reliably performed after the start of execution of the application request. As a result, the accuracy of detection of the contact between the brake pads 33 and the disc rotor 4 after the start of execution of the application request can be further improved.

In the second embodiment, the given time period is set as the time period corresponding to the predetermined number of revolutions (rotation amount) of the electric motor 43B. In this case, even when there is a change in the current value supplied to the electric motor 43B, for example, there is a change in the rotation speed of the electric motor 43B, the time necessary to calculate the average value of the no-load current can be ensured independently of the change. As a result, the accuracy of the calculation of the average value can be improved.

In the second embodiment, even when the application request is given during the release while the ABS control is being performed, the application request is executed after the elapse of the given time period from the detection of the separation between the brake pads 33 and the disc rotor 4. In this case, during the given time period, a state in which the brake pads 33 and the disc rotor 4 are separated is maintained, and hence the braking force can be reliably released. In this manner, time in which the wheels (rear wheels 3) are not locked can be increased, thereby improving stability of the vehicle during the ABS control.

In the second embodiment, there has been described, as an example, the case where the elapse of the given time period is waited for after the detection of the contact or the separation between the brake pads 33 and the disc rotor 4 in both of the control processing, specifically, the application control processing illustrated in FIG. 14 and the release control processing illustrated in FIG. 15. However, the present invention is not limited thereto. For example, the elapse of the given time period may be waited for in only one of the control processing.

In each of the embodiments described above, there has been described, as an example, the case where the requests generated by the request generating unit include three types of requests, specifically, the request generated by the parking brake switch 18 (request given by the driver), the request based on the determination logics described above, and the request based on the ABS control. However, the present invention is not limited thereto. For example, the requests may include only two requests or one request of the above-mentioned three types of requests. Specifically, the requests can include at least any one of the above-mentioned three types (or two types) of requests. Further, the request generating unit may be provided so as to generate a request other than the above-mentioned three types of requests.

In each of the embodiments described above, there has been described, as an example, the case where the contact between the brake pads 33 and the disc rotor 4 is determined based on the difference between the average value of the no-load current flowing after the convergence of the inrush current and the present current. However, the present invention is not limited thereto, and other determination references may be used. For example, the contact between the pads and the rotor may be determined, specifically, the contact between the driven member and the piston may be determined based on the current value which has become equal to or larger than a predetermined value, elapse of a given time period from the start of drive of the electric motor, or the like.

In each of the embodiments described above, there has been described, as an example, the case where the separation between the brake pads 33 and the disc rotor 4 is determined, that is, zero thrust force is determined, based on the detection of the present current, which is decreased to the predetermined current value after the convergence of the inrush current, and the present temporal change amount in current, which becomes equal to or smaller than the predetermined change amount after the detection. However, the present invention is not limited thereto, and other determination references may be used. For example, the separation between the pads and the rotor may be determined, specifically, the separation between the driven member and the piston may be determined based on the current value which has become equal to or smaller than a predetermined value, elapse of a given time period from the start of drive of the electric motor, or the like.

In each of the embodiments described above, there has been described, as an example, the case where the disc brakes 31 having the electric parking brake function are used as the left and right rear-wheel brakes. However, the present invention is not limited thereto. For example, the disc brakes having the electric parking brake function may be used as the brakes for all the wheels (all the four wheels). Specifically, brakes for at least a pair of the wheels of the vehicle may be constructed by the disc brakes having the electric parking brake function.

In each of the embodiments described above, the hydraulic disc brakes 31, each with the electric parking brake, have been described as an example. However, the present invention is not limited thereto. The disc brakes may be electric disc brakes that do not require supply of the hydraulic pressure. Further, the disc brake may be configured as a drum-brake type brake device without being limited to the disc-brake type brake device. Further, there can be adopted various types of brake mechanisms such as a drum-in-disc brake including a drum-type electric parking brake provided to a disc brake or a configuration for retaining the parking brake by pulling a cable by an electric motor.

According to the embodiments described above, the pads and the rotor can be maintained in the desired positional relationship.

Specifically, according to the embodiments, when the second request is received from the request generating unit after the start of execution of the first request, the execution unit executes the second request after the detection unit detects the contact or the separation between the pads and the rotor. In other words, the execution unit continues the execution of the first request without starting the execution of the second request until the pads and the rotor are brought into contact with each other or separated from each other even when the second request is given during the execution of the first request. Therefore, the execution unit can maintain the pads and the rotor in the desired positional relationship, based on the contact or the separation between the pads and the rotor as the reference.

More specifically, the contact or the separation between the pads and the rotor, that is, the degree of load of the electric motor with respect to the piston, can be detected based on the change in current of the electric motor, for example, the current value or the temporal change amount (derivative value). The execution unit terminates the execution of the first request being currently executed and starts the execution of the second request being a subsequent request on condition that the change in current is detected. Therefore, the positional relationship between the pads and the rotor can be regulated (controlled) with high accuracy based on the contact or the separation as the reference even without providing the position sensor configured to detect the positions of the pads, the thrust-force sensor configured to detect the thrust force, or the like.

According to the embodiments, the first request is the application request for applying the braking force to the vehicle, and the second request is the release request for releasing the braking force to the vehicle. When receiving the release request within the time period from the start of execution of the application request to the detection of the contact between the pads and the rotor by the detection unit, the execution unit inhibits execution of the release request, and executes the release request after the detection unit detects the contact between the pads and the rotor. Specifically, the execution unit continues the execution of the application request until the pads and the rotor are brought into contact with each other without starting the execution of the release request even when the release request is given during the execution of the application request. Therefore, the execution unit can maintain the pads and the rotor in the desired positional relationship, based on the contact between the pads and the rotor as the reference.

According to the embodiments, the first request is the release request for releasing the braking force to the vehicle, and the second request is the application request for applying the braking force to the vehicle. When receiving the application request within the time period from the start of execution of the release request to the detection of the separation between the pads and the rotor by the detection unit, the execution unit inhibits execution of the application request, and executes the application request after the detection unit detects the separation between the pads and the rotor. Specifically, the execution unit continues the execution of the release request until the pads and the rotor are separated from each other without starting the execution of the application request even when the application request is given during the execution of the release request. Therefore, the execution unit can maintain the pads and the rotor in the desired positional relationship, based on the separation between the pads and the rotor as the reference.

According to the embodiments, after the start of the execution of the release request, the execution unit executes the application request after the elapse of the given time period from the detection of the separation of the pads and the rotor by the detection unit. In this case, the separation distance between the pads and the rotor can be increased as a result of the elapse of the given time period. Therefore, after the start of the execution of the application request, the change in current (change in inrush current) in the early time of the drive of the electric motor can be detected before the pads and the rotor are brought into contact with each other. Specifically, the change in current after the start of execution of the application request can be classified into the change generated in the early time of the drive of the electric motor and the change caused due to the contact between the pads and the rotor, that is, the change in current can be clearly defined. As a result, the accuracy of detection of the contact between the pads and the rotor after the start of execution of the application request can be improved.

According to the embodiments, the given time period corresponds to the time period necessary to calculate the average value of the no-load current flowing after the convergence of the inrush current flowing immediately after the start of execution of the application request by the execution unit. In this case, besides the detection of the inrush current, the subsequent calculation of the average value of the no-load current can be reliably performed after the start of execution of the application request. As a result, the accuracy of detection of the contact between the pads and the rotor after the start of execution of the application request can be further improved.

According to the embodiments, the given time period is set as the time period corresponding to the predetermined number of revolutions of the electric motor. In this case, even when there is a change in the current value supplied to the electric motor, for example, there is a change in the rotation speed of the electric motor, the time necessary to calculate the average value of the no-load current can be ensured independently of the change. As a result, the accuracy of the calculation of the average value can be improved.

According to the embodiments, the detection unit calculates the difference between the average value of the no-load current flowing after the convergence of the inrush current flowing immediately after the start of the execution of the application request by the execution unit and the present current, and when the difference becomes equal to or larger than the predetermined value, detects the contact between the pads and the rotor. In this case, as compared to, for example, the configuration for detecting the contact between the pads and the rotor based on the derivative value of the current, the detection can be less affected by the temporal change (noise) in current. As a result, the accuracy of detection of the contact between the pads and the rotor can be improved.

According to the embodiments, the detection unit detects that the present current is decreased to the predetermined current value after the convergence of the inrush current flowing immediately after the start of execution of the release request. When the present temporal change amount in current becomes equal to or smaller than the predetermined change amount after the detection, the detection unit detects the separation between the pads and the rotor. In this case, the separation between the pads and the rotor is detected not only on condition that the present current is decreased to the predetermined current value but also on condition that the temporal change amount in current becomes equal to or smaller than the predetermined change amount. Therefore, by using the two conditions corresponding to the current value and the temporal change amount in current, the separation between the pads and the rotor can be detected with high accuracy.

According to the embodiments, in a case where the change in current, which is caused by the inrush current flowing immediately after the start of execution of the release request, is defined as the first peak and the change in current subsequent to the first peak is defined as the second peak, when the detection unit detects the separation between the pads and the rotor without detecting the second peak, the execution unit executes the application independently of the request generated by the request generating unit. In this case, the abnormality regarding whether or not the power (rotation) of the electric motor is transmitted, specifically, whether or not the idling is occurring can be determined based on the change in current after the execution of the application. As a result, the improvement of reliability of the brake device can be achieved.

According to the embodiments, the request generated by the request generating unit includes at least any one of the request generated by the operation of the driver or the request generated by the ABS control unit configured to control the ABS. In this case, the locking (slip) of the wheels can be suppressed. Specifically, even when the application request is given during the execution of the release request, the execution of the release request is continued until the pads and the rotor are separated from each other. As a result, the pads and the rotor can be reliably separated from each other. By the separation, the braking force is released so that the locking of the wheels can be suppressed. In particular, when the application request is to be executed after the elapse of the given time period from the detection of the separation between the pads and the rotor, a state in which the pads and the rotor are separated is maintained for the given time period to enable reliable release of the braking force. As a result, a time period in which the wheels are not locked can be increased, thereby enabling the improvement of stability of the vehicle during the ABS control.

According to the embodiments, the piston is moved not only by the feeding of the current to the electric motor but also by the supply of the hydraulic pressure. Thus, the detection unit detects the contact or the separation between the pads and the rotor in consideration of the displacement of the piston based on the hydraulic pressure. In this case, even when the piston is displaced based on the supply of the hydraulic pressure, which is caused by use of a main brake (service brake) or the like, the contact or the separation between the pads and the rotor can be appropriately detected.

According to the embodiments, the piston is moved by the driven member that is moved by the electric motor toward the piston or in a direction away from the piston. When the hydraulic pressure is applied to the piston, the detection unit detects the contact between the pads and the rotor based on the change in current, which is caused by the contact of the driven member with the piston. In this case, even when the hydraulic pressure is applied to the piston, the contact between the pads and the rotor can be appropriately detected.

According to the embodiments, when the hydraulic pressure is applied to the piston, the detection unit detects the separation between the pads and the rotor based on the elapsed time from the start of drive of the electric motor. In this case, even when the hydraulic pressure is applied to the piston, the separation between the pads and the rotor can be appropriately detected.

The embodiments of the present invention have been described above. The embodiments of the present invention described above are intended for easy understanding of the present invention, and do not limit the present invention. It is apparent that the present invention can be changed and modified without departing from the spirit thereof and encompasses equivalents thereof. Further, within a range in which the above-mentioned problems can be at least partially solved or within a range in which the effects are at least partially obtained, a suitable combination or omission of the components recited in the claims and described in the specification is possible.

The present application claims priority to the Japanese Patent Application No. 2014-266815 filed on Dec. 27, 2014. The entire disclosure including Specification, Scope of Claims, Drawings, and Abstract of Japanese Patent Application No. 2014-266815 filed on Dec. 27, 2014 is incorporated herein in its entirety by reference.

REFERENCE SIGNS LIST 2 front wheel (wheel), 3 rear wheel (wheel), 4 disc rotor (rotor), 6 brake pedal, 18 parking brake switch (request generating unit), 19 parking brake control device (request generating unit, execution unit, detection unit), 24 current sensor unit (detection unit), 33 brake pad (pad), 39 piston, 42 linearly movable member (driven member), 43B electric motor

The invention claimed is:

1. A brake device, comprising:
a pad configured to press a rotor, which is rotated together with a wheel, to thereby apply a braking force to a vehicle;
a piston configured to move the pad toward the rotor or in a direction away from the rotor;
an electric motor configured to move the piston when a current is fed to the electric motor;
a request generating unit configured to generate a first request and a second request, each relating to the braking force to the vehicle;
an execution unit configured to receive the first request or the second request generated by the request generating unit to feed the current to the electric motor in accordance with the first or second request, to thereby execute the first or second request; and
a detection unit configured to detect contact or separation between the pad and the rotor based on a change in a current of the electric motor,
wherein, when receiving the second request within a time period from start of execution of the first request to detection of the contact or the separation between the pad and the rotor by the detection unit, the execution unit inhibits execution of the second request, and executes the second request after the detection unit detects the contact or the separation between the pad and the rotor,
wherein the first request is an application request for applying the braking force to the vehicle,
wherein the second request is a release request for releasing the braking force to the vehicle, and
wherein the execution unit is configured to inhibit execution of the release request when receiving the release request within a time period from start of execution of the application request to the detection of the contact between the pad and the rotor by the detection unit and to execute the release request after the detection unit detects the contact between the pad and the rotor.

2. The brake device according to claim 1, wherein the detection unit is configured to detect that a present current is decreased to a predetermined current value after convergence of an inrush current flowing immediately after the start of the execution of the release request, to thereby determine the separation between the pad and the rotor when a present temporal change amount in current becomes equal to or smaller than a predetermined change amount after the detection.

3. The brake device according to claim 2, wherein, in a case where a change in current, which is caused by the inrush current flowing immediately after the start of the execution of the release request is defined as a first peak and a change in current subsequent to the first peak is defined as a second peak, when the detection unit detects the separation between the pad and the rotor under a state in which the second peak is not detected, the execution unit executes application independently of the request generated by the request generating unit.

4. The brake device according to claim 1, wherein the detection unit is configured to calculate a difference between an average value of a no-load current flowing after convergence of an inrush current flowing into the electric motor immediately after the start of the execution of the application request by the execution unit and a present current, to thereby determine the contact between the pad and the rotor when the difference becomes equal to or larger than a predetermined value.

5. A brake device, comprising:
a pad configured to press a rotor, which is rotated together with a wheel, to thereby apply a braking force to a vehicle;
a piston configured to move the pad toward the rotor or in a direction away from the rotor;
an electric motor configured to move the piston when a current is fed to the electric motor;
a request generating unit configured to generate a first request and a second request, each relating to the braking force to the vehicle;
an execution unit configured to receive the first request or the second request generated by the request generating unit to feed the current to the electric motor in accordance with the first or second request, to thereby execute the first or second request; and
a detection unit configured to detect contact or separation between the pad and the rotor based on a change in a current of the electric motor,
wherein, when receiving the second request within a time period from start of execution of the first request to detection of the contact or the separation between the pad and the rotor by the detection unit, the execution unit inhibits execution of the second request, and executes the second request after the detection unit detects the contact or the separation between the pad and the rotor,
wherein the first request is a release request for releasing the braking force to the vehicle,
wherein the second request is an application request for applying the braking force to the vehicle, and
wherein the execution unit is configured inhibit execution of the application request when receiving the application request within a time period from start of execution of the release request to the detection of the separation between the pad and the rotor by the detection unit and to execute the application request after the detection unit detects the separation between the pad and the rotor.

6. The brake device according to claim 5, wherein the execution unit is configured to execute the application request after elapse of a given time period from the detection of the separation between the pad and the rotor by the detection unit after the start of the execution of the release request.

7. The brake device according to claim 6, wherein the given time period corresponds to a time period necessary to calculate an average value of a no-load current flowing after convergence of an inrush current flowing into the electric motor immediately after the start of the execution of the application request by the execution unit.

8. The brake device according to claim 7, wherein the given time period is set as a time period corresponding to a predetermined number of revolutions of the electric motor.

* * * * *